United States Patent
Lebrun

(10) Patent No.: US 12,051,173 B2
(45) Date of Patent: Jul. 30, 2024

(54) METHODS AND APPARATUS FOR BLENDING UNKNOWN PIXELS IN OVERLAPPING IMAGES

(71) Applicant: GoPro, Inc., San Mateo, CA (US)

(72) Inventor: Marc Lebrun, Issy-les-Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 269 days.

(21) Appl. No.: 17/230,177

(22) Filed: Apr. 14, 2021

(65) Prior Publication Data

US 2021/0327026 A1 Oct. 21, 2021

Related U.S. Application Data

(60) Provisional application No. 63/011,972, filed on Apr. 17, 2020.

(51) Int. Cl.
*G06K 9/00* (2022.01)
*G06T 3/4007* (2024.01)
*G06T 3/4038* (2024.01)
*G06T 5/20* (2006.01)
*G06T 5/50* (2006.01)
(Continued)

(52) U.S. Cl.
CPC .......... *G06T 3/4038* (2013.01); *G06T 3/4007* (2013.01); *G06T 5/20* (2013.01); *G06T 5/50* (2013.01); *G06T 3/12* (2024.01); *G06T 2207/20016* (2013.01); *G06T 2207/20076* (2013.01); *G06T 2207/20216* (2013.01); *G06T 2207/20221* (2013.01); *G06T 2207/20224* (2013.01); *G06V 10/16* (2022.01); *G06V 30/141* (2022.01)

(58) Field of Classification Search
CPC .................. G03B 37/04; H04N 2013/0088
See application file for complete search history.

(56) References Cited

U.S. PATENT DOCUMENTS

2009/0058991 A1* 3/2009 Kim ............... H04N 23/698
348/E7.001
2017/0070689 A1* 3/2017 Silverstein ......... H04N 25/61
(Continued)

OTHER PUBLICATIONS

Zhao, Nan, and Xinqi Zheng. "Multi-band blending of aerial images using GPU acceleration." 2017 10th International Congress on Image and Signal Processing, BioMedical Engineering and Informatics (CISP-BMEI). IEEE, 2017.*
(Continued)

*Primary Examiner* — Emily C Terrell
*Assistant Examiner* — Owais Iqbal Memon
(74) *Attorney, Agent, or Firm* — Wang Hardoon, P.C.

(57) ABSTRACT

Methods and apparatus for blending unknown pixels in overlapping images. In one embodiment, an action camera captures two hyper-hemispherical fisheye images that are stitched to a 360° panorama. In order to remove exposure differences between the two cameras, the images are pre-processed prior to multiband blending. The pre-processing leverages image information from pixels to make informed guesses about pixels that were not captured. In particular, various pixels with different knowability (e.g., known, unknown, consistent, and conflicting) may be handled differently so as to emphasize/de-emphasize their importance in pre-processing.

20 Claims, 14 Drawing Sheets

(51) Int. Cl.
G06T 3/12 (2024.01)
G06V 10/10 (2022.01)
G06V 30/14 (2022.01)

(56) References Cited

U.S. PATENT DOCUMENTS

| | | | |
|---|---|---|---|
| 2018/0205889 A1* | 7/2018 | Abbas | H04N 23/698 |
| 2019/0014260 A1* | 1/2019 | Mu | G06T 3/0093 |
| 2019/0259139 A1* | 8/2019 | Ichihashi | G06T 3/4038 |
| 2019/0370949 A1* | 12/2019 | Hutchinson | G06T 3/4038 |
| 2020/0294194 A1* | 9/2020 | Sun | G06T 3/4038 |
| 2021/0082086 A1* | 3/2021 | Bichu | G06T 5/80 |

OTHER PUBLICATIONS

Burt, Peter J., and Edward H. Adelson. "A multiresolution spline with application to image mosaics." ACM Transactions on Graphics (TOG) 2.4 (1983): 217-236.*

Zhao, Nan, and Xinqi Zheng. "Multi-band blending of aerial images using GPU acceleration." 2017 10th International Congress on Image and Signal Processing, BioMedical Engineering and Informatics (CISP-BMEI). IEEE, 2017. (Year: 2017).*

Burt, Peter J., and Edward H. Adelson. "A multiresolution spline with application to image mosaics." ACM Transactions on Graphics (TOG) 2.4 (1983): 217-236. (Year: 1983).*

Zhu, Chenhui, et al. "Real-time image mosaic based on optimal seam and multiband blend." 2019 IEEE 8th Joint International Information Technology and Artificial Intelligence Conference (ITAIC). IEEE, 2019. (Year: 2019).*

* cited by examiner

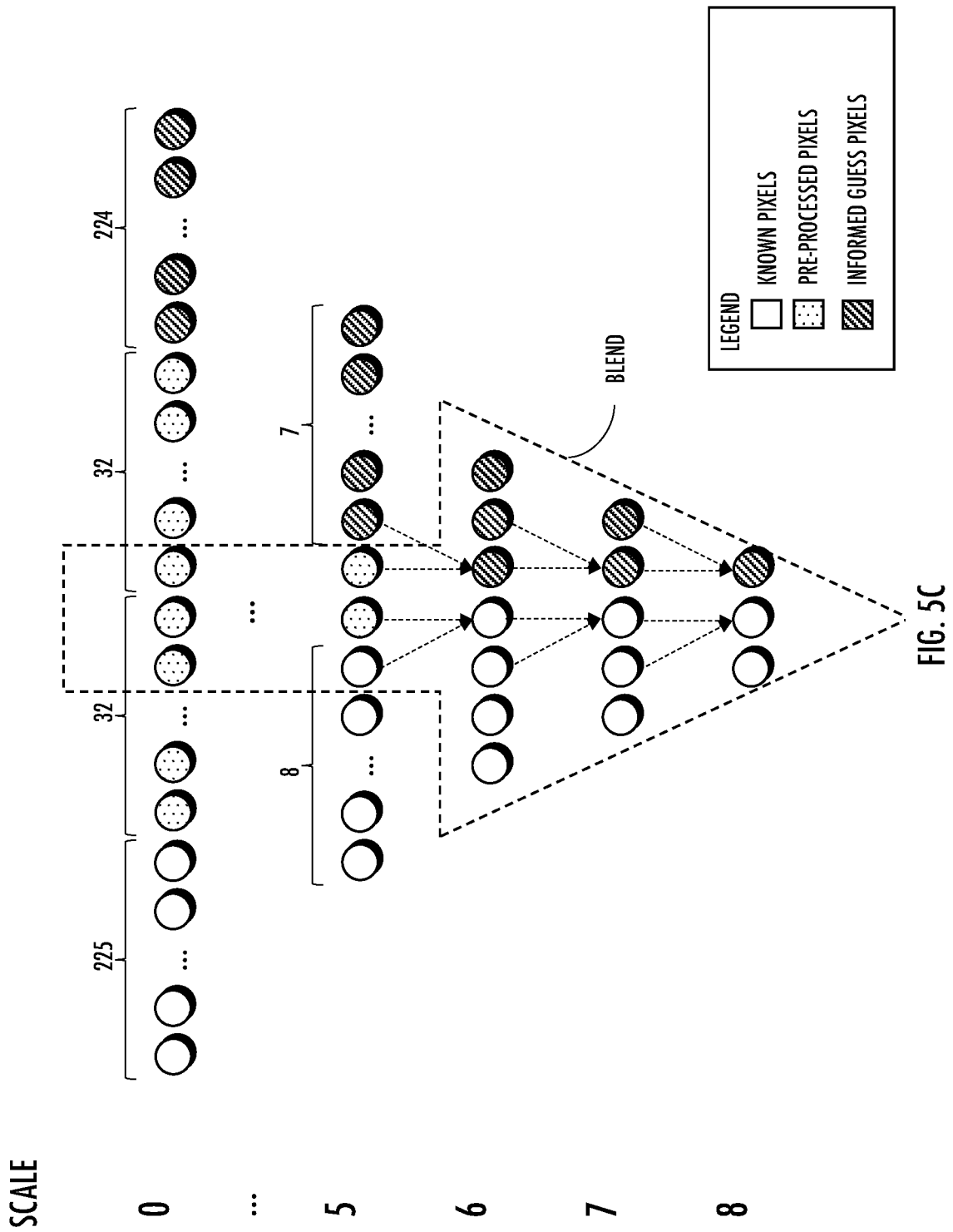

METHODS AND APPARATUS FOR BLENDING UNKNOWN PIXELS IN OVERLAPPING IMAGES

PRIORITY

This application claims the benefit of priority to co-owned U.S. patent Application Ser. No. 63/011,972 entitled "METHODS AND APPARATUS FOR BLENDING UNKNOWN PIXELS IN OVERLAPPING IMAGES", filed Apr. 17, 2020, the contents of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to image processing. Specifically, the present disclosure relates in some exemplary aspects to, inter alia, image processing of spherical content within e.g., image processing ecosystems.

DESCRIPTION OF RELATED TECHNOLOGY

Sophisticated image processing techniques can be used to achieve a number of different visual effects. As but one such example, "multiband blending" is a commonly used technique for combining images. Advantageously, multiband blending preserves high frequency image information (e.g., edges are not washed out), while still ensuring that low frequency image information is smoothly blended.

In the photographic arts, the field of view (FOV) (or angle of view) is the part of the world that is captured by the camera at a particular position and orientation in space. Typical, "point and shoot" cameras have a FOV of ~60'; "wide angle" photography refers to photography that exceeds a FOV of 60°; for example, action cameras (such as the GoPro HERO™ families of devices) can capture 360° spherical content (e.g., pictures and video.)

Digital post-processing techniques provide consumers with a myriad of image editing effects. As but one example, images can be re-projected (e.g., stretched, shrunk, warped) so as to impart various aesthetic perspectives, etc. As another example, panoramic images from multiple cameras can be "cropped" (cut) and stitched together to focus on a particular object of interest. Modern image editing techniques may enable users to create images and video that exceed the physical capabilities of single lens camera photography.

In the exemplary context of 360° photography, exposure differences between multiple devices used to capture image data (e.g., a front and back camera) result in a visible seam. Empirically, exposure transitions generally require a minimum overlap (e.g., 513 pixels) to provide a seamless blend (based on existing multiband blending techniques). Unfortunately, however, existing formats only provide an insufficient overlapping region (e.g., 64 pixels or two 32-pixel bands).

SUMMARY

The present disclosure discloses, inter alia, methods and apparatus for blending conflicting and/or unknown pixels in overlapping images.

In one aspect, methods and apparatus configured to blend unknown pixels in overlapping images are disclosed. One exemplary method includes: obtaining partially overlapping content; identifying the unknown pixels in the partially overlapping content; pre-processing the unknown pixels to create completely overlapping images; and performing a multiband blend on the completely overlapping images. In a related embodiment, an apparatus configured to perform the foregoing techniques is described. In one exemplary embodiment, the apparatus may include a processor, and a non-transitory computer-readable medium comprising one or more instructions which when executed, cause the apparatus to: obtain partially overlapping content; identify the unknown pixels in the partially overlapping content; pre-process the unknown pixels to create completely overlapping images; and perform a multiband blend on the completely overlapping images.

In another aspect, methods and apparatus configured for image processing are disclosed. One exemplary apparatus includes: a processor; and a non-transitory computer-readable medium including one or more instructions which, when executed by the processor causes the apparatus to: receive a first image and a second image, where the first image and the second image are partially overlapping images, the first image comprising a first known portion and a first unknown portion and the second image comprising a second known portion and a second unknown portion; estimate pixel values of the first unknown portion of the first image based on the second known portion of the second image; and blend the first image and the second image based on the estimating. In a related embodiment, a method configured to perform the foregoing techniques is described. In one exemplary embodiment, the method may include: receiving a first image and a second image, where the first image and the second image are partially overlapping images, the first image comprising a first known portion and a first unknown portion and the second image comprising a second known portion and a second unknown portion; estimating pixel values of the first unknown portion of the first image based on the second known portion of the second image; and blending the first image and the second image based on the estimating.

In yet another aspect, methods and apparatus configured for image processing are disclosed. One exemplary apparatus includes a non-transitory computer-readable apparatus comprising a storage medium having a computer program stored thereon, the computer program comprising a plurality of instructions configured to, when executed by a processor apparatus, cause an apparatus to: obtain partially overlapping video content; identify unknown pixels in the partially overlapping video content; pre-process the unknown pixels to create completely overlapping video content; and perform a multiband blend on the completely overlapping video content. In a related embodiment, a method configured to perform the foregoing techniques is described. In one embodiment, the exemplary method includes: obtaining partially overlapping video content; identifying unknown pixels in the partially overlapping video content; pre-processing the unknown pixels to create completely overlapping video content; and performing a multiband blend on the completely overlapping video content.

In another related aspect, methods, systems, and apparatus for blending unknown and/or conflicting pixels in overlapping images are disclosed.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a non-transitory computer readable storage apparatus implementing one or more of the foregoing aspects is disclosed and described. In one embodiment, the computer readable apparatus includes a program memory, or an EEPROM. In another embodiment, the apparatus includes a solid-state drive (SSD) or other mass storage device. In another embodiment, the apparatus includes a USB or other "flash drive" or other such portable removable storage device.

In a further aspect, a system is disclosed. In one embodiment, the system includes one or more camera apparatus configured on accordance with one or more of the foregoing aspects.

In a further aspect, methods, systems, and apparatus for "pyramid" image data processing are disclosed.

In a further aspect, methods, systems, and apparatus for enhanced image data blending (such as for 360-degree imagery) are disclosed.

Other aspects, features and advantages of the present disclosure will immediately be recognized by persons of ordinary skill in the art with reference to the attached drawings and detailed description of exemplary embodiments as given below.

BRIEF DESCRIPTION OF THE DRAWINGS

The disclosed embodiments have other advantages and features which will be more readily apparent from the following detailed description of the invention and the appended claims, when taken in conjunction with the accompanying drawings.

FIGS. 5A-5C are graphical representations of exemplary techniques for blending conflicting and/or unknown pixels in overlapping images, in accordance with the various principles described herein.

DETAILED DESCRIPTION

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Existing Multiband Image Blending

As a brief aside, there are many different image processing techniques that may be used to blend images; one commonly used technique is so-called "multiband blending."

Figure 1A:
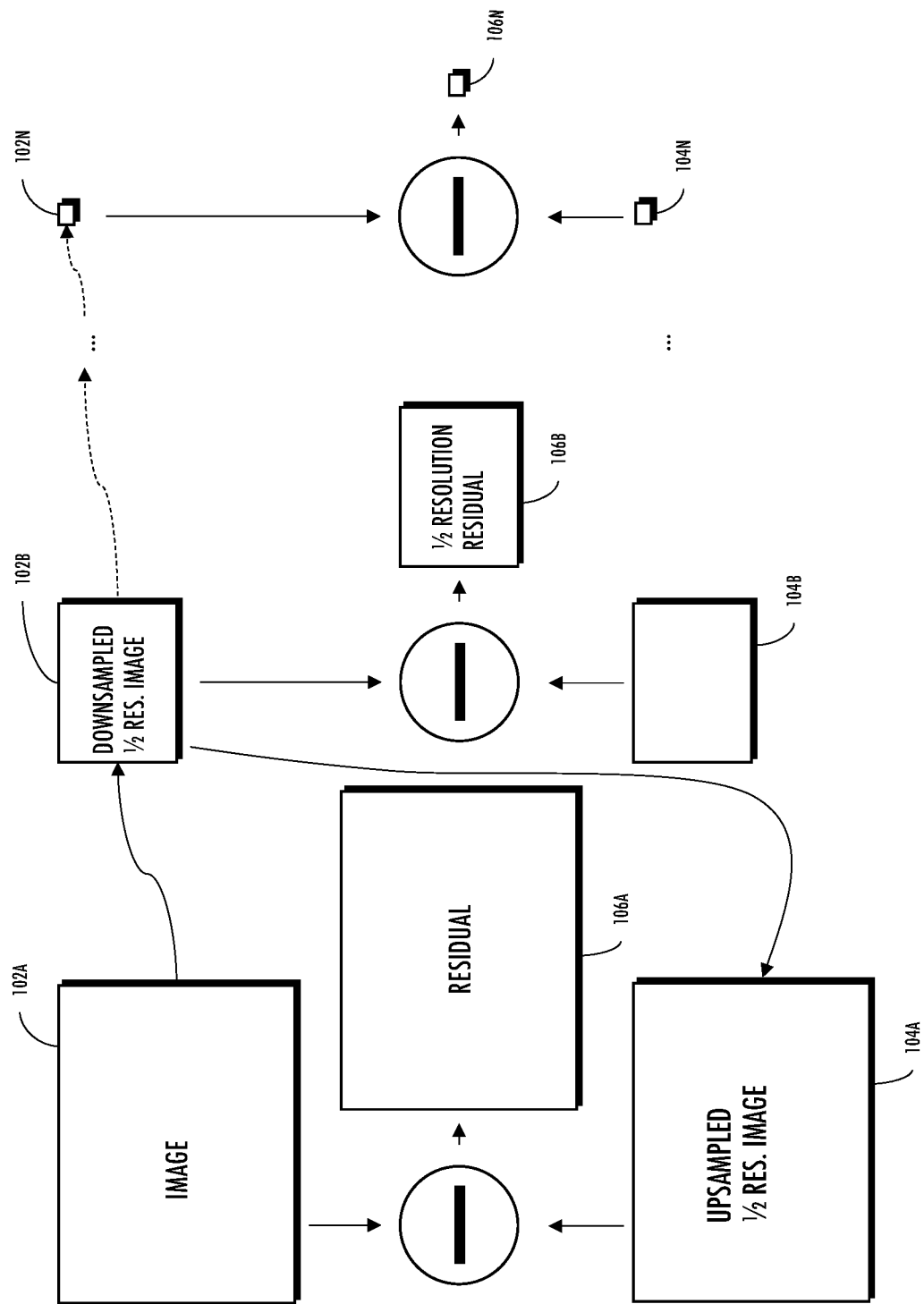
FIGS. 1A-1B are graphical representations of multiband image processing, useful for explaining multiband blending.

FIG. 1A is a graphical representation of "pyramid" image processing useful in explaining multiband blending. As shown in FIG. 1A, an image can be separated into its constituent frequency components via an iterative process of blurring and subtraction. This is analogous to a two-dimensional wavelet transform (a decomposition of a signal into a set of contractions, expansions, and translations of a basis wavelet) For example, an image 102A may be downsampled to a half-resolution image 102B. The half-resolution image 102B is then upsampled to create an upsampled ¼ resolution image 104A. The residual image 106A is created by subtracting the upsampled image 104A from the original image 102A. This process is iteratively repeated to the extent required (each iteration uses more processing resources but preserves fidelity across a broader frequency range). Notably, the residual "pyramid" of images 106A through 106N contains all of the difference information necessary to recreate the original image 102A from the downsampled counterpart 102N (which may be a single pixel for images having evenly divisible dimensions).

Figure 1B:
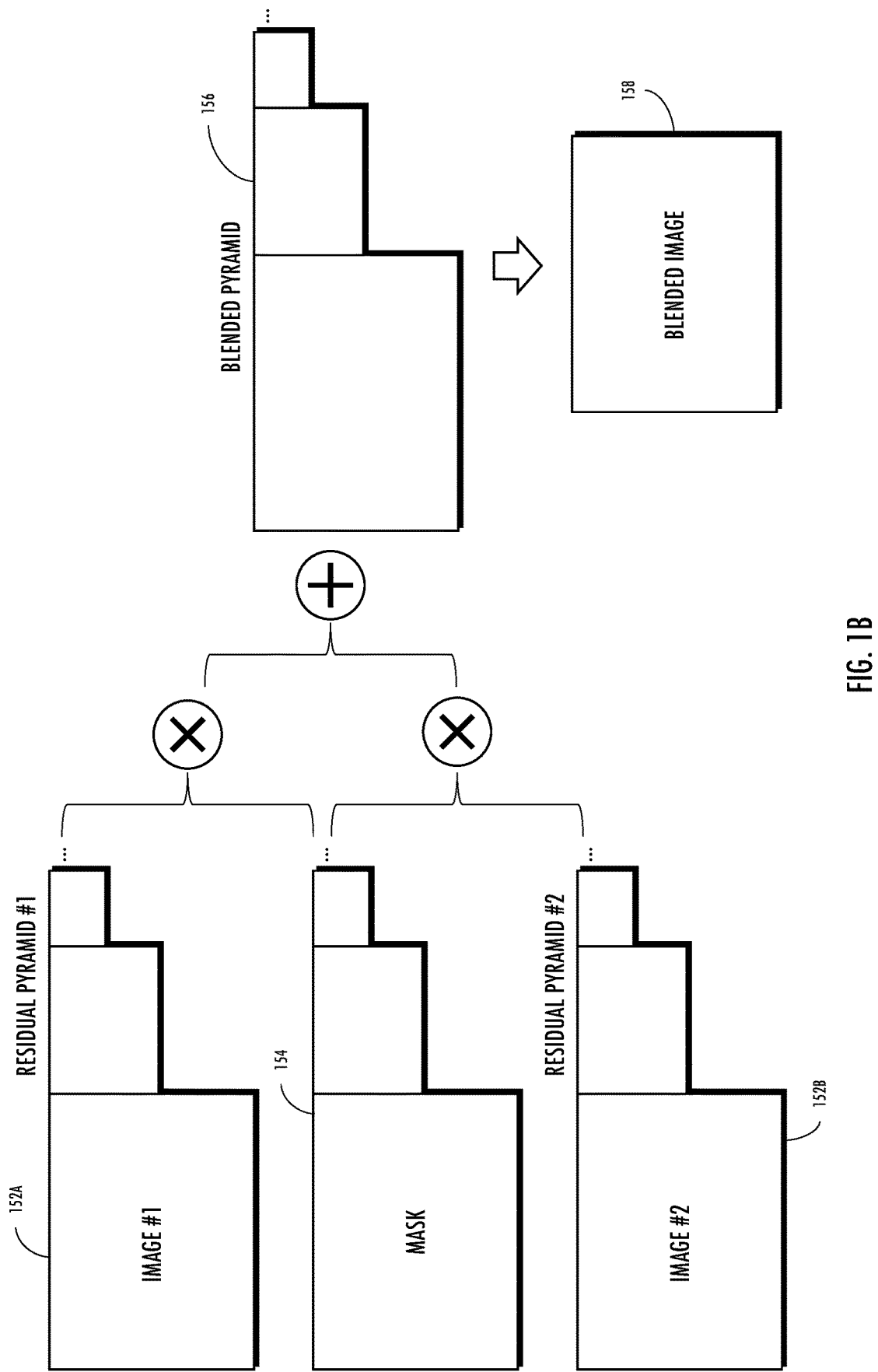

Referring now to FIG. 1B, one representation of multi-band blending based on pyramid image representations is shown. As shown therein, multiband blending can be performed with two images by building residual pyramid image representations 152A, 152B of the two images. A "mask" pyramid 154 is constructed. The mask 154 defines a blend weight between the first and the second image pyramids for each pyramid level. For each pyramid level, the levels of the two pyramids 152A, 152B are combined based on the weights of the mask pyramid 154 and summed together to create a blended pyramid 158. Collapsing together all the level-wise summations, generates a resulting output blended image 158.

Many variants of multiband blending exist for a variety of different applications and/or constraints. For example, some implementations may only use a subset of the image pyramid tiers (or scales), so as to reduce processing and/or memory burden (resulting in some image information loss). Similarly, some implementations may use different masking weights; for example, linear weights and gaussian weights. Yet other variants may adjust how upsampling and/or downsampling are performed; for example, "non-power-of-two" images cannot be evenly halved (downsampled); a variety of techniques exist to handle the remainders.

Multiband Blending for Spherical Image Processing Applications

Historically, the aforementioned multiband blending operation was used to patch together two images of different spectral densities (for example, photoshopping a picture of a person into a landscape picture.) More recently however, multiband blending has been adapted to panoramic applications. For example, action camera systems use multiple cameras to capture panoramic content (view angles greater than 120°; in some cases, up to a full 360° view). Multiband blending can be used to resolve differences between camera captures.

Figure 2A:
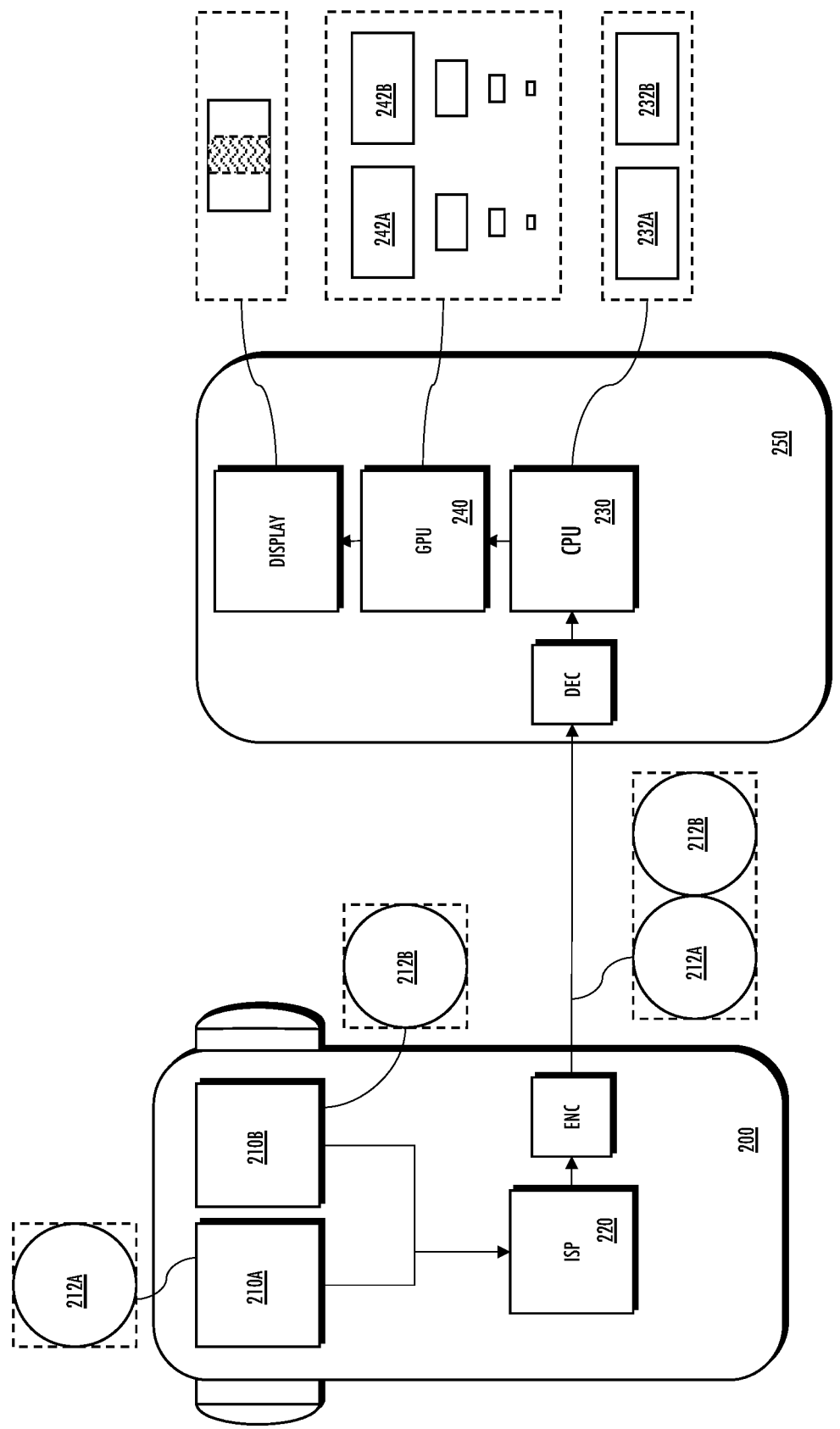
FIGS. 2A-2C are logical block diagrams illustrating an exemplary image processing ecosystem, useful for explaining various embodiments of the present disclosure.

FIG. 2A is a logical block diagram of an action camera 200 in data communication with a laptop, smart phone, or similarly capable editing/display device 250, useful to illustrate various aspects of the present disclosure. As shown therein, the camera system 200 includes a "front-facing" camera 210A and a "back-facing" camera 210B. The action camera 200 further includes an Image Signal Processor (ISP) 220 and a codec to transfer media. In addition, the action camera may transport other data (e.g., metadata, etc.) via an external interface (e.g., USB, memory card, etc.) The laptop 250 includes a central processing unit (CPU) 230 to handle general compute tasks. Additionally, the laptop 250 may include a specialized graphic processing unit (GPU) 240, codec for processing media, external interface, and/or other user interface components (a touchscreen display, etc.)

As another brief aside, action cameras and other 360° applications have unique use considerations that are different than e.g., traditional photography. For example, the action camera may operate under a broad range of lighting conditions: one camera may be well lit, whereas the other is poorly lit. The differences in exposure between the cameras may result in unique image processing complications. Specifically, the different lighting conditions for each camera sensor result in different exposure times and shutter speeds which affect color, white balance, and contrast in unpredictable ways. These differences in shooting conditions can create a visible "exposure transition" and/or undesirable "lens flare" in the resulting fisheye images. More generally, multi-camera photography may experience a wide variety of differences in captured images that are caused by the camera mechanisms, rather than the subject being photographed. Common examples of such image artifacts include without limitation: lens flares, disparate shading, color banding (and other digitization errors), etc.

Ideally, the exposure transition can be blended using the aforementioned multiband blending techniques. However, multiband blending is a computationally intensive task that has been historically handled in post-processing. As shown in FIG. 2A, the fisheye images 212A, 212B are transmitted off-camera to a laptop, smart phone, or similarly capable editing/display device 250. The laptop 250 may include a dedicated graphic processing unit (GPU) 230. The workstation CPU 230 converts the fisheye images 212A, 212B to rectangular image formats 232A, 232B. Overlapping portions of the rectangular image formats 232A, 232B are provided to a GPU for multiband blending (242A, 242B). The resulting blended image can be displayed and/or stored for subsequent use.

Notably, GPUs 230 have a number of characteristics that are functionally different from both image signal processors (ISPs) 220 and general-purpose central processing units (CPUs) 230. As but one example, GPUs are constructed in a highly parallel structure for processing large blocks of image data with specialized logic (e.g., dedicated matrix multiplication logic, deep pipelines, etc.) In contrast, ISPs 220 are typically optimized for mobile use (e.g., low power operation and camera-specific management). Similarly, CPUs 230 are generalized to handle a much wider variety of processing (e.g., frequent branching and/or conditional operations accessing many different types of data structures).

As previously alluded to, multiband blending algorithms are designed to work on rectangular images since the downsampling and upsampling operations use a rectangular kernel. As a practical matter, the action camera 200 may mathematically re-project the fisheye images to rectangular image formats 232A, 232B. In one exemplary embodiment of the present disclosure, the fisheye images are re-projected to an equi-angular cubemap (EAC). Techniques for fisheye-to-EAC conversion are discussed in greater detail within U.S. patent application Ser. No. 16/572,383, filed Sep. 16, 2019, and entitled "METHODS AND APPARATUS FOR MAXIMIZING CODEC BANDWIDTH IN VIDEO APPLICATIONS", and U.S. patent application Ser. No. 16/730,839, filed Dec. 30, 2019, and entitled "METHODS AND APPARATUS FOR MAXIMIZING CODEC BANDWIDTH IN VIDEO APPLICATIONS", each of which are incorporated herein by reference in its entirety, although it will be recognized that these techniques are exemplary, and others may be substituted with equal success.

Figure 2B:
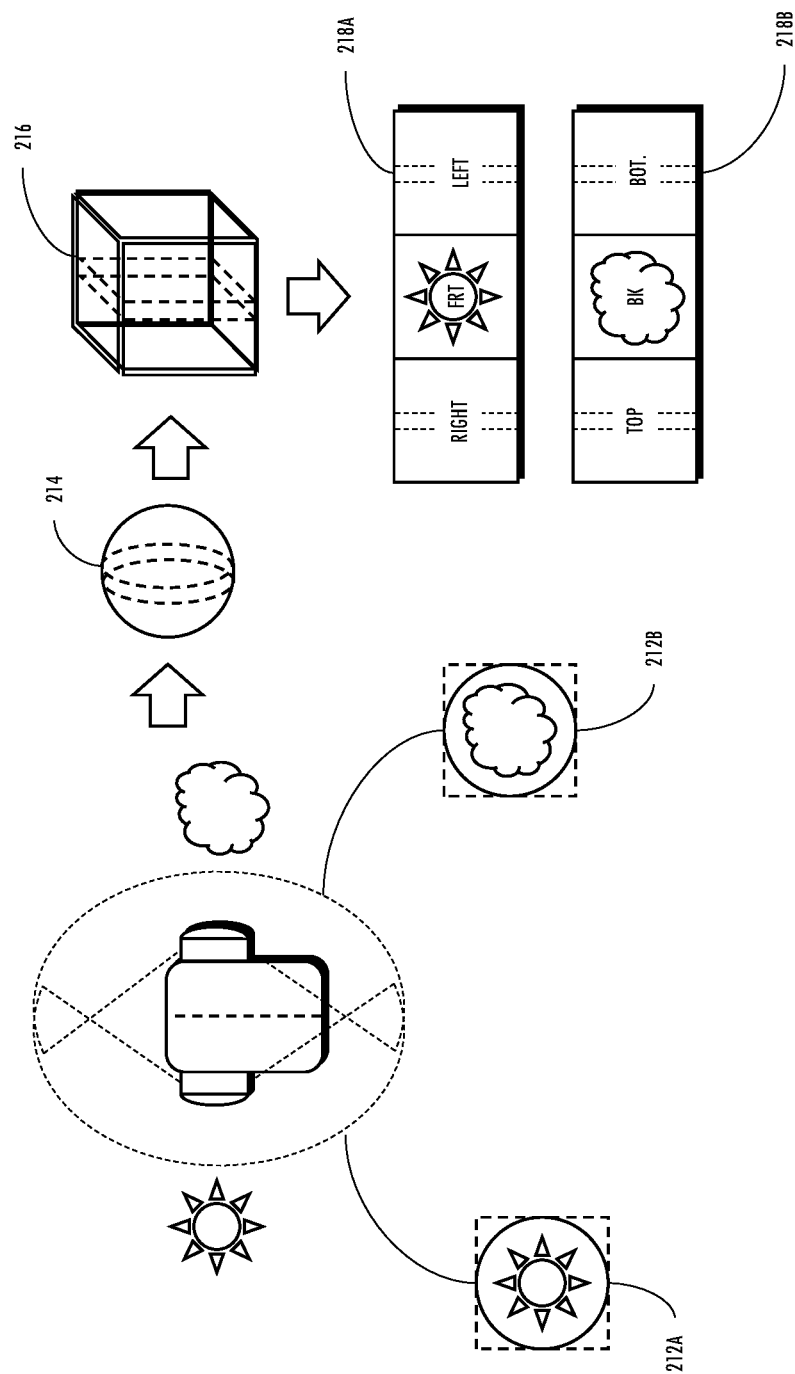

Referring now to FIG. 2B, a graphical illustration of one such exemplary fisheye-to-EAC conversion is depicted. During operation, the first camera 210 captures a first fisheye image 212A and a second camera 210B captures a second fisheye image 212B. In the illustrated embodiment, the fisheye images 212A, 212B are hyper-hemispherical images that overlap (e.g., by 10° degrees). These overlapping regions may be used for the multiband blending and/or image stitching. The fisheye image data 212A, 212B may be roughly stitched "in-camera" into two (2) hemispheres of a spherical projection 214. Artisans of ordinary skill in the related arts will readily appreciate that stitching in-camera uses the overlapping image data between the two (2) original images in order to generate the two (2) hemispheres of the spherical projection 214. Stitching combines the fisheye images to ideally produce an imperceptible (or minimally perceptible) transition between the two (2) hemispheres of the spherical projection 214. Image stitching techniques commonly include e.g., edge detection, motion detection, parallax correction, perspective warping, etc. As shown in FIG. 2B, the overlapping image data is retained for subsequent multiband blending.

The spherical projection 214 is converted into an EAC projection 216 with retained overlapping image data. The EAC projection may entail warping the fisheye data according to the ideal mathematical relationship between the spherical projection and the EAC projection. Subsequently thereafter, the EAC projection 216 with retained overlapping image data may in one approach be divided into front, back, left, right, top, and bottom portions, wherein each portion represents image data from corresponding fields of view from the two fisheye cameras. For example, the front portion of the spherical projection corresponds to image data from the center of fisheye image 212A. The back portion of the spherical projection corresponds to image data from the center of fisheye image 212B. The top portion of the spherical projection corresponds to image data stitched together from the top parts of the front and back fisheye images 212A/212B. The left, right, and bottom portions of the spherical projection are similarly collected from their corresponding images.

The front, back, left, right, top, and bottom portions of the fisheye image data are mapped onto corresponding front, back, left, right, top, and bottom facets of an EAC projection. In one exemplary embodiment, the EAC projection 216 with retained overlapping image data can be split into a first image segment 218A (corresponding to the right, front, and left facets), and a second image segment 218B (corresponding to the top, back, and bottom facets). Notably, the exemplary partitioning ensures that each facet represents a continuous image (e.g., right and back facets share an edge), which may improve compression and/or reduce compression artifacts caused by image discontinuities.

While the present disclosure is discussed in the context of EAC, any rectangular format may be substituted with equal success. For instance, in one exemplary variant, the multiband algorithm may be applied on an equi-rectangular projection (ERP). Due to the differences in pixel information density of ERP (versus EAC) and the potentially lossy/noisy nature of stitching, ERP projections may further benefit from additional manipulations. As but one such example, an ERP projection can be rotated such that the "stitch line" runs horizontally through the center of the ERP (where the ERP is least distorted). Minimizing image distortions along the stitch line reduces stitching complexity and/or reduces the possibility of introducing undesirable stitching artifacts.

Figure 2C:
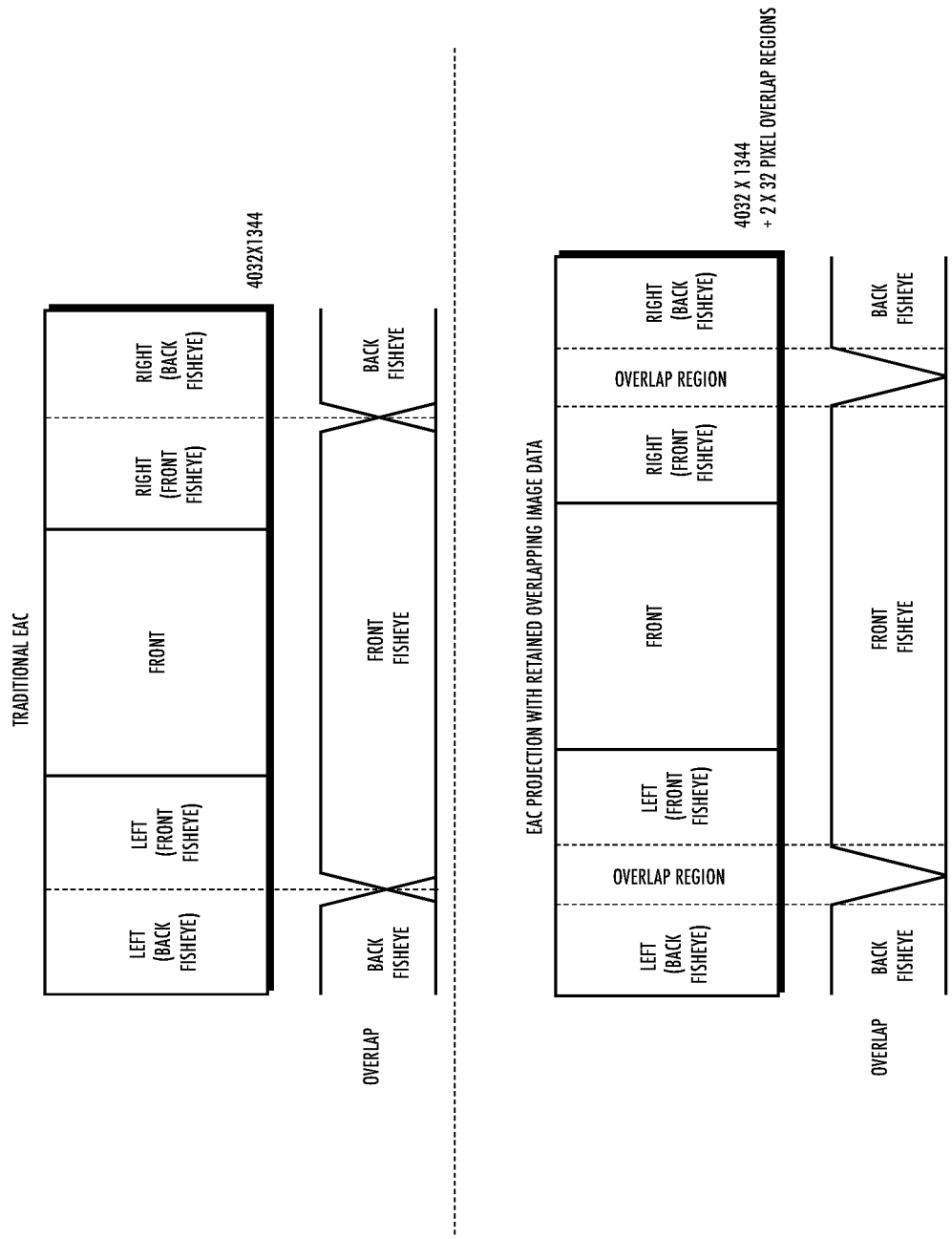

FIG. 2C provides a graphical illustration that illustrates the structural differences between a traditional EAC projection, and the exemplary EAC projection with retained overlapping image data. As shown therein, a traditional EAC data structure uses the image stitching information to blend image data from the front and back fisheyes at the transition point. In contrast, the exemplary EAC projection with retained overlapping image data has been stitched but preserves both sides of the overlapping data.

As a brief aside, encoding and decoding of audio/visual (A/V) media can be handled via either software emulation, or in dedicated hardware circuits. Hardware codecs are composed of physical logic and sequential components; thus, hardware codecs have hard limitations on the amount of data that they can process (e.g., throughput) and the size of data they can handle (e.g., row and/or column buffer sizes). For example, most existing hardware codecs that comply with High Efficiency Video Coding (HEVC) Level 5.1 include hardware components that accept pixel line widths up to (but not exceeding) 4096 pixels (and/or pixel column depths up to 2160 pixels). In contrast, software-based codecs can be useful where the A/V media is of unusual size/frame rate or has non-standardized features. Unfortunately, software-based codec operation logically emulates hardware with arithmetic operations which consumes processing resources and is much slower (e.g., 50×). In the illustrated embodiment of FIG. 2C, an EAC that uses 1344×1344 cube faces can be split into two (2) image segments of 4032×1344 that include 2 overlap bands (of 32 pixels width). The modified EAC data structure fits within the hardware limitations of most HEVC 5.1 commodity codecs (4096×1344).

Example Operation

As previously alluded to, incipient research is directed to using multiband blending to remove exposure transitions, lens flare, and other multi-camera effects in 360° applications. However, existing multiband algorithms do not have enough "knowledge" to seamlessly blend across the exposure transition and remove/reduce lens flare.

Figure 3A:
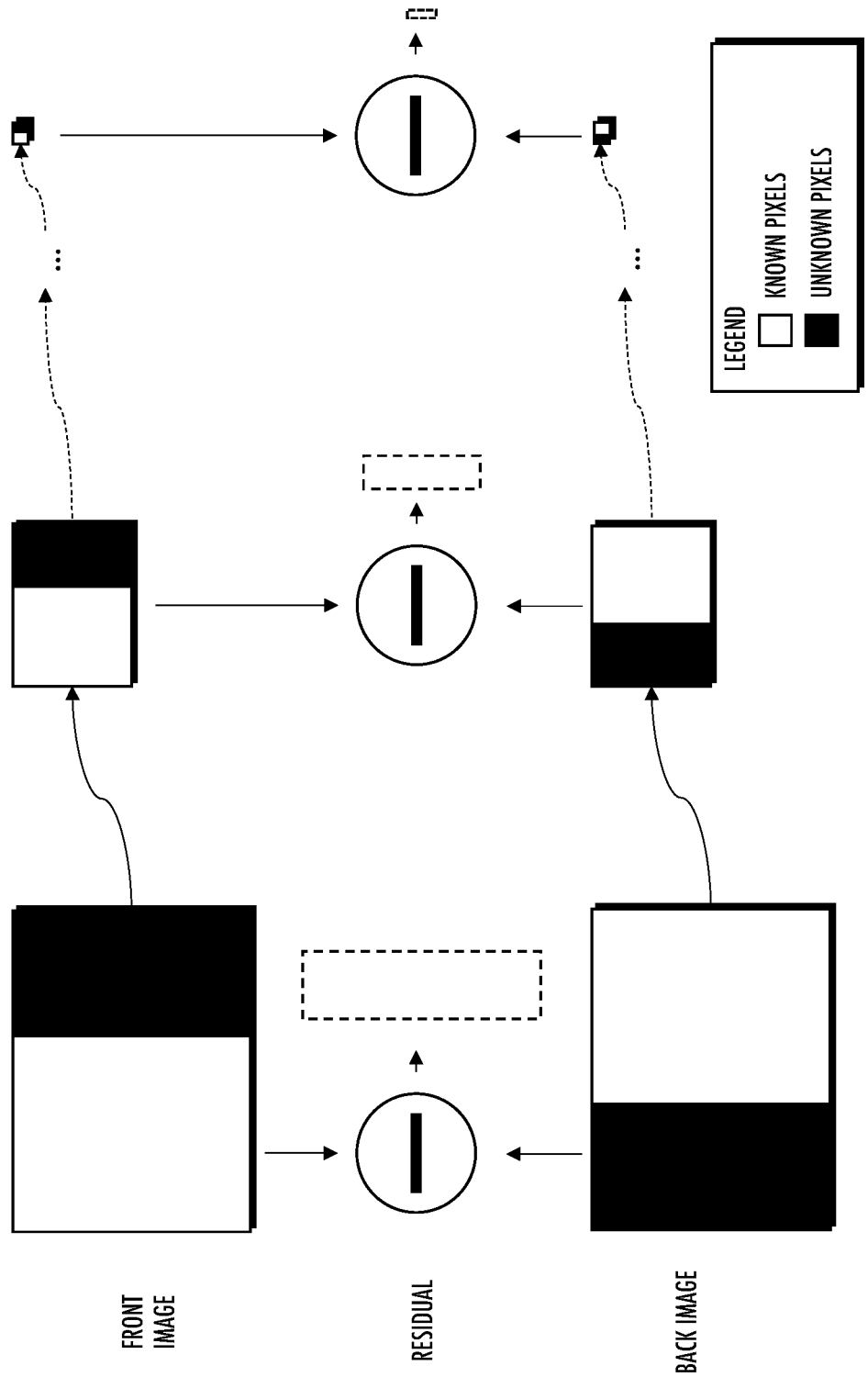
FIGS. 3A-3C are graphical representations of existing techniques for multiband image processing of partially overlapping images.
Figure 3B:
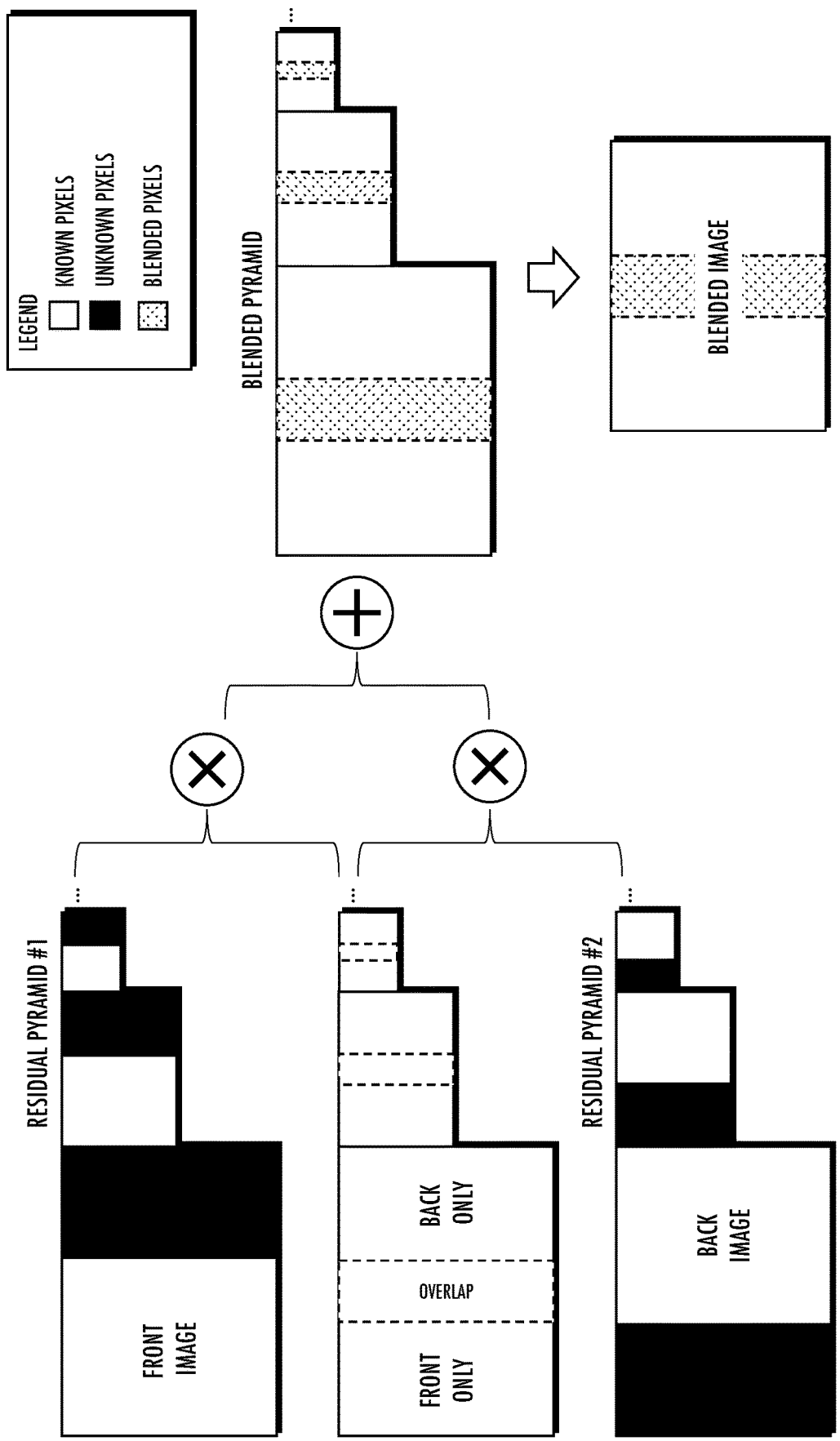
Figure 3C:
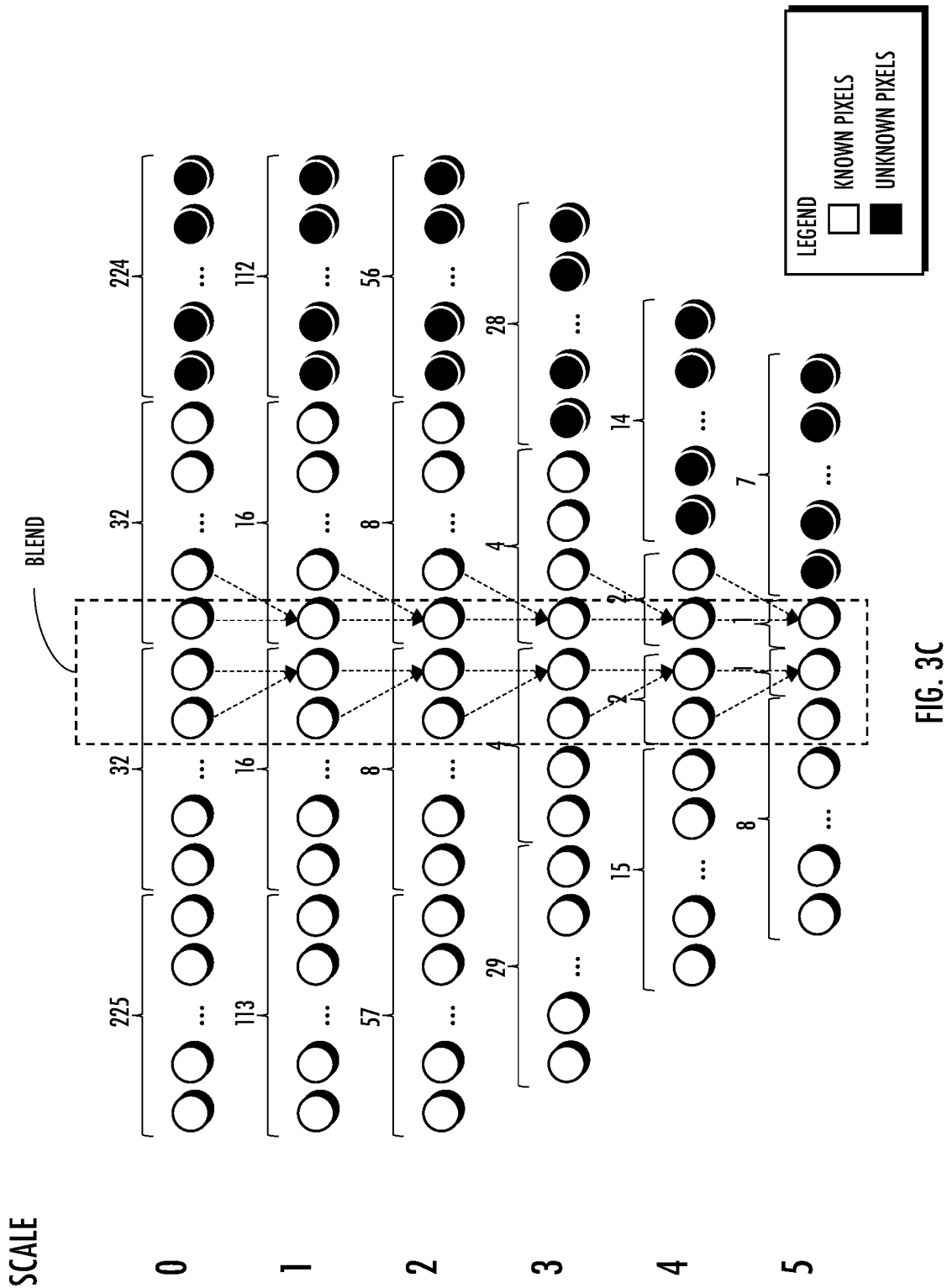

FIGS. 3A-3C are graphical representations of existing techniques for multiband image processing of partially overlapping images. Consider EAC image projections that include overlapping image data for 5.6K spherical content; as previously noted, the segments are each 4096×1344 (4032×1344 with two 32-pixel width overlap bands). Two bands (513-pixels width) are cut-out/generated from the front and back camera portions. Specifically, the front image includes: 288 known pixels (of which 64 pixels are in an "overlap region"), and 225 unknown pixels. The back image includes: 289 known pixels (of which 64 pixels are in the overlap region), and 224 unknown pixels.

As shown in FIG. 3B, mask values are assigned for three (3) different regions of the 513-pixels band: (i) a "front only" region (224 pixels), an overlap region (64 pixels), and a "back only" region (225 pixels). Singularly known pixels are assigned a weight value of 1 (a weight of 1 is assigned for the front only pixels of the front image, and a weight of 1 is assigned for the back only pixels of the back image). Unknown pixels are assigned a weight value of 0. Overlap pixels that are "known" in both images are assigned complementary weights that smooth the transition from known to unknown pixels (e.g., from 1 to 0 for the front image, and 0 to 1 for the back image).

Referring now to FIG. 3C, a graphical representation of the pixel dependency for blending is shown for scales 0-5. At each iteration, the pixels are downscaled, and a subset of the downsampled pixels are blended. For example, at scale 1 there are: 113 known pixels, 32 overlap pixels, and 112 unknown pixels, etc. In the illustrated implementation, only the middle three (3) columns are blended together. One observation: the blend is only performed with overlap pixels up to the 5th iteration (scale 4); however, the 6th-9th iteration (scales 5-8) would require information from pixels that are "unknown." Existing multiband blends cannot use the unknown pixels because of the exposure differences between the images; thus, these portions are not blended.

Computationally, the foregoing approach is simple, however the blend is visually perceptible and introduces many undesirable visual artifacts (e.g., biases in lens flare correction, etc.) Empirically, a multiband blend over 513-pixels (corresponding to 9 iterations of a multiband blend) is useful to imperceptibly smooth over exposure transition artifacts. Unfortunately, in the foregoing implementation, the overlapping area is only a 64-pixel width band. In other words, the existing blend does not have enough overlap information to effectively perform a full 513-pixel width multiband blend to smooth the exposure transmission.

Conceptually, the foregoing process only considers two (2) distinct states of knowledge: (i) known pixels and (ii) unknown pixels. However, a vast portion of the multiband blend (224-pixel width front band, 225-pixel width back band) only uses information from one of the cameras. Consequently, improved techniques for multiband blending based on a wider basis of information are needed.

Various embodiments of the present disclosure leverage image knowability information in order to pre-process images for multiband blending. Notably, "unknown" pixels were captured by the other camera (using different exposures) and so some information is available. The unknown pixels may include exposure differences and/or lens flare, and thus cannot be directly used to remove the exposure transition and lens flare effects. However, the various embodiments of the methods described herein correct/compensate for differences in exposure/lens flare based on the unknown pixel's knowability. In particular, pixels with different knowability (e.g., known, unknown, consistent, and conflicting) may be pre-processed differently so as to correct/compensate for coloration biases caused by exposure differences.

Figure 4:
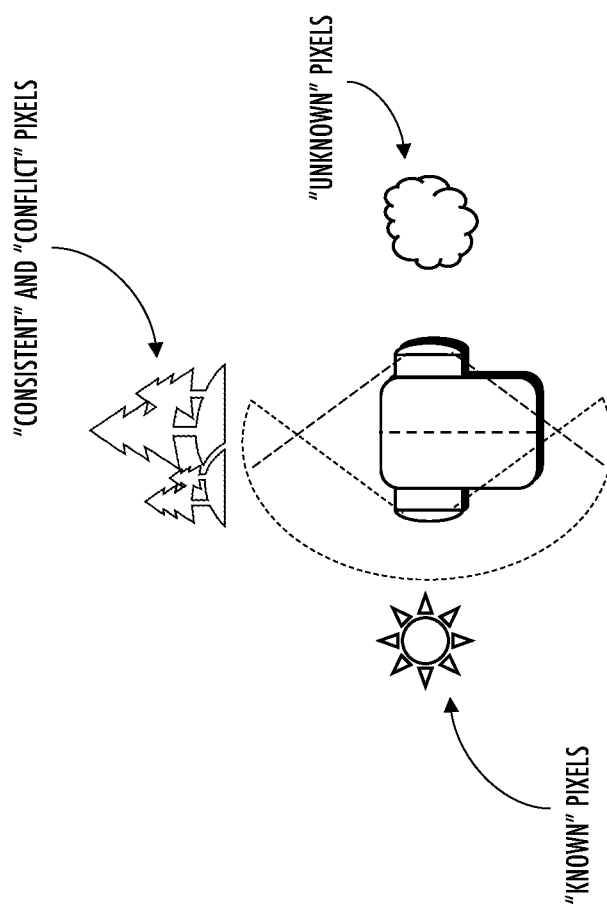
FIG. 4 is a graphical illustration of the known, unknown, and conflicting pixels, of a partially overlapping image, useful to illustrate various aspects of the present disclosure.

Referring now to FIG. 4, a graphical representation of image data captured by an exemplary action camera is shown to illustrate "knowable" information within multi-camera photography. Objects that are only present in one camera's field of view are represented by "known" pixel values. Similarly, objects that are outside of the camera's field of view are "unknown" pixels. However, objects that lie in the overlap region may be associated with two (2) distinct pixel values: (i) a first value corresponding to the front camera, and (ii) a second value corresponding to the second camera. For objects that are correctly stitched and do not suffer parallax, the two values reflect the differences in exposure caused by the different lighting conditions for each camera sensor; these pixels are referred to throughout as "consistent" pixels. In other cases, the differences in pixel values may reflect real differences between the two cameras' fields of view (e.g., lens flare, parallax issues, etc.) and/or stitching artifacts; these pixels are referred to throughout as "conflicting" pixels.

Figure 5A:
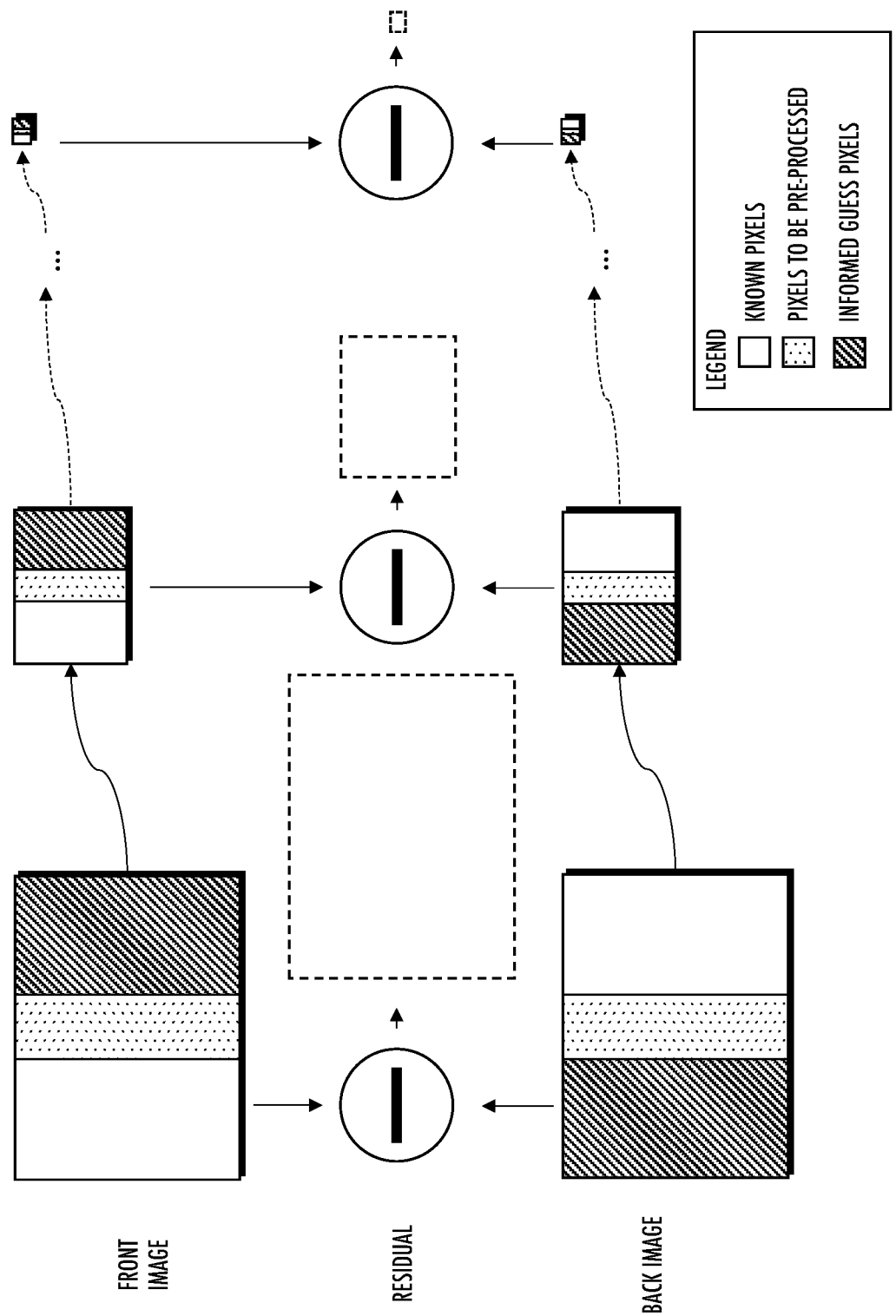
Figure 5B:
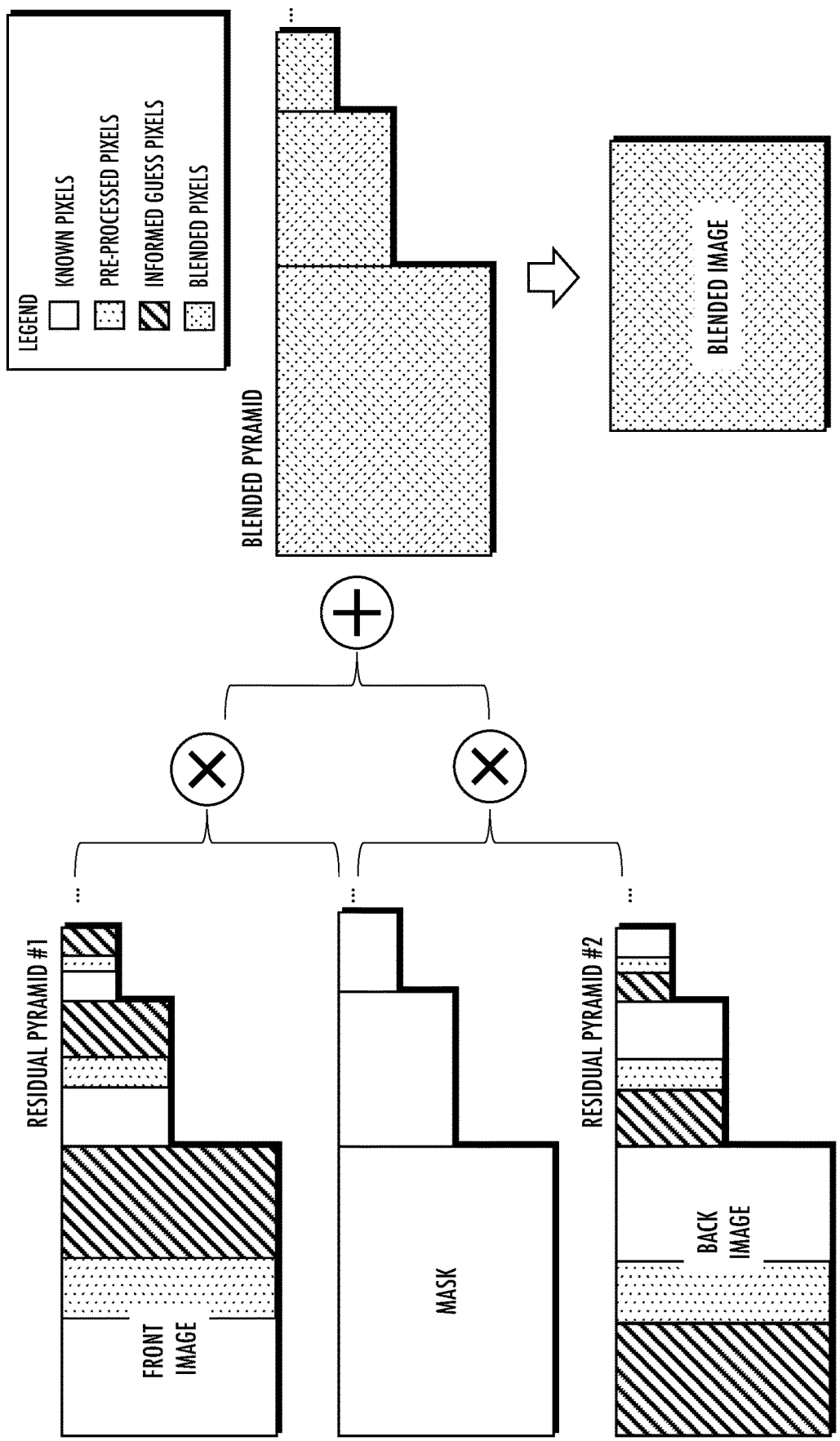

FIGS. 5A-5C are graphical representations of exemplary techniques for multiband image processing of partially overlapping images, in accordance with the various principles described herein. As before, consider an EAC image projection that includes overlapping image data for 5.6K spherical content; the segments are each 4096×1344 (4032×1344 with two 32-pixel width overlap bands). Two bands (513-pixels wide) are cut-out/generated from the front and back camera portions. The front image includes: 224 known pixels, 64 "pixels to be pre-processed" (the overlap region), and 225 "informed guess" pixels to be generated based on the back image pixels. The back image includes: 225 known pixels, 64 "pixels to be pre-processed" (the overlap region), and 224 "informed guess" pixels to be generated based on the front image pixels.

In one embodiment, the bands are extracted from the EAC content based on their relative displacement within the overlap region. Known pixels may be copied from a first image, and unknown pixels may be estimated from the other image. Specifically, unknown pixels are taken from known pixels of the opposite lens/image after compensating for a local offset between both lenses. In one embodiment, known pixels may be accessed directly, whereas the corresponding unknown pixels may be accessed with an offset of hs+2*ho, where hs is half the size stretched faces and ho is half the total overlap region.

Notably, the overlap region ("pixels to be pre-processed") of FIG. 5A provides important information about the exposure differences between the two images. For example, consistent pixels within the overlap region can be analyzed to identify coloration differences caused by the exposure differences. However, conflicting pixels reflect actual differences in capture information e.g., lens flare, stitching errors, and/or parallax effects; conflicting pixels do not reflect exposure information and would introduce noise if treated as such. Thus, as a preliminary pre-processing step, the overlap region must be first sorted into consistent pixels and conflicting pixels.

As a brief aside, camera exposure settings affect the entire captured image. Notably, the camera image signal processing compensates for e.g., color, white balance, contrast, etc. The resulting raw image data is encoded based on a color encoding system (e.g., YUV, RGB, etc.), As a result, exposure differences between different cameras manifest as low frequency color components for their respective images; in some cases, these low frequency adjustments can be approximated as offsets (e.g., luminance offset, chrominance offset, etc.), Unfortunately, encoded color data does not directly correspond to the camera compensation; i.e., camera corrections cannot be reversibly inferred from the encoded YUV values, etc. While the following discussion is presented in the context of color-coded image manipulations, some cameras may provide compensation information within metadata which may be a valuable source of information that can be further leveraged to improve sorting treatment.

In view of the low frequency nature of coloration caused by exposure differences, consistent pixels will have similar coloration offsets to neighboring pixels, whereas conflicting pixels will significantly differ. Thus, in one exemplary embodiment, the overlap region of the front image and the overlap region of the back image can be differenced. By analyzing the differences between the overlap regions, the pixels can be sorted into consistent and conflicting pixels. As a further observation, knowability is generally constant for the down/up-sampling of the columns of the image, but not as a function of rows; thus, the pixel analysis may be further simplified to a column-based analysis (also referred to as "rings").

In one exemplary approach, each column of pixels of the front and back is normalized by removing an average coloration value of the column. For example, the average coloration offset can be calculated by averaging the coloration among all pixels of the same column. After normalization, the rings are differenced (subtracted). Difference values that exceed a similarity threshold correspond to conflicting pixels that are discarded for coloration estimation (e.g., stitching artifacts, parallax effects, etc.), Difference values that fall under the similarity threshold correspond to consistent pixels between the two overlap regions. In one variant, the similarity threshold may be based on e.g., the average coloration value of the column (mean or median); in other variants, the threshold may be pre-configured and/or dynamically configured.

In one specific implementation, an offset is estimated to compensate for luminance difference, and then applied. The average value of both bands is computed over each column of overlapping pixels and for each channel (YUV, RBG, etc.) An offset may be selected between the column average of the band. An exemplary offset may be computed as follows:

$$O_F(j) = \Sigma i b_F(i,j) \qquad \text{Eqn. 1:}$$

$$O_B(j) = \Sigma i b_B(i,j) \qquad \text{Eqn. 2:}$$

Where:
i and j are the line and column indexes of the band,
$b_F$ and $b_B$ are the Front and Back band, and
$O_F$ and $O_B$ are the Front and Back offset, respectively.

Figure 6:
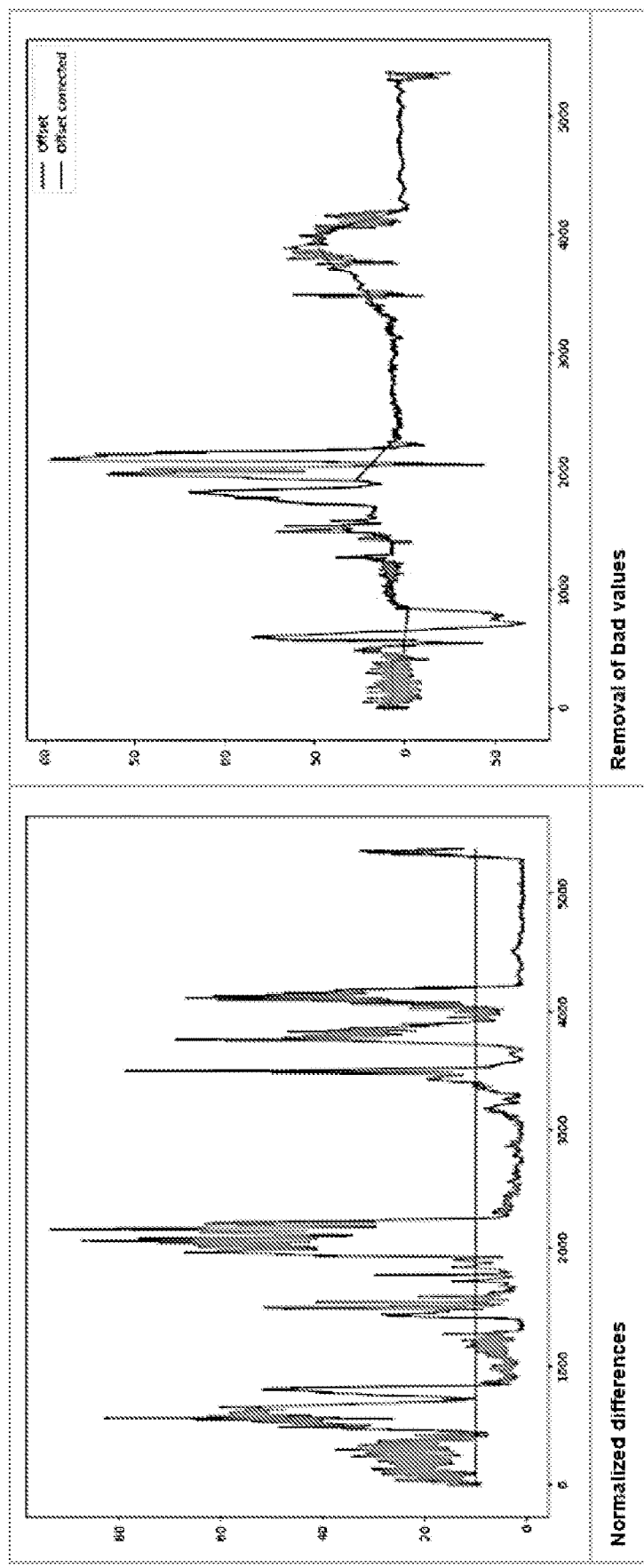
FIG. 6 is a graphical representation a technique for sorting overlapping pixels into consistent pixels and conflicting pixels, useful in conjunction with the principles described herein.

In some cases, replacement coloration offset values for the conflicting pixels can be generated. In one such variant, replacement luminance and chrominance values can be interpolated from nearby consistent pixel values. As used herein, the term "interpolation" refers to estimation of new data that occurs within the range of a discrete set of known data points. FIG. 6 is a graphical representation of one such analysis based on normalized differences between the overlapping bands, and subsequent correction (removal of bad values). As shown therein, replacement luminance and chrominance values can be generated based on a linear fit according to nearby consistent pixels. Other interpolation techniques may be substituted with equal success; examples of interpolation techniques include without limitation: piecewise constant interpolation, polynomial interpolation, spline interpolation, gaussian interpolation, and/or any other fitting technique.

Variations of the foregoing sorting scheme may be substituted with equal success by artisans of ordinary skill, given the contents of the present disclosure. For example, while the foregoing discussion is presented in the context of luminance and chrominance (YUV), other color encodings may be substituted (RGB, etc.) Similarly, while the foregoing discussion is presented in the context of multiple channels, other variants may use single channels (e.g., luminance only, etc.) or other enumerated data channel. In some such variants, multiple channels may be used to identify a common mask that can be used to generate a single mask that identifies conflicting pixels across all color ranges, etc. Still other variants may use a normalized difference, etc.

Once the overlap region has been pre-processed, then the unknown pixel regions can be created. In one such variant, replacement luminance and chrominance values can be extrapolated from the coloration offset differences between the two images. As used herein, the term "extrapolation" refers to estimation of new data that occurs outside the range of a discrete set of known data points. Referring back to FIG. 5B, known pixels from the other camera are adjusted for differences in color encoding based on a coloration offset and used as an "informed guess" pixel value. In one exemplary implementation, the informed guess pixels are extrapolated from known pixels of the other image that have been adjusted for coloration differences using coloration offsets. Specifically, an unknown pixel of the front image is replaced with a known pixel from the corresponding position in the back image that has been modified by the corresponding coloration offsets.

In one embodiment, the calculated coloration offset may be adjusted in order to avoid problems due to an imperfect stitch, remove outlier values, etc. In one specific implementation, a multi-step cleaning process may be used that: (i) removes values using a difference-based filter, and (ii) removes values using an offset-based filter. Other variants may use either step individually to remove outlier offset values.

In one embodiment, the difference-based filter removes pixel values that exceed the average pixel value for the column. Specifically, pixel values that exceed the $L^1$ norm of a column are removed. The $L^1$ norm of a normalized difference is computed between the overlapping sections using the following formula:

$$D_c(j) = \Sigma i |(b_F(i,j) - O_F(j) - b_B(i,j) - O_B(j)| \qquad \text{Eqn. 3:}$$

Where:
D is the difference,
c represents the color channel.
i and j are the line and column indexes of the band,
$b_F$ and $b_B$ are the Front and Back band, and
$O_F$ and $O_B$ are the Front and Back offset, respectively.

For YUV embodiments, chrominance channels (UV) are not in the same range as the luminance (Y) channel and may be normalized by multiplying the U and V channel differences by 20.436 and 20.615 respectively. Difference filtering may then be applied using a sliding window, such as a 1×3 sliding window illustrated below.

$$D(j) = \max_c \{D_c(j-1), D_c(j) D_c(j+1)\} \qquad \text{Eqn. 4:}$$

The difference may be compared to a threshold ($\tau$); the threshold may be made adaptive where the mean ($\Sigma$), and standard deviation ($\sigma$) are computed based on the difference (D(j)) as shown in equation (and inequality) 5.

$$\tau = \frac{1}{W} \sum_{j=0}^{W} D(j) 1_{|D(j) - \Sigma| < \tau_d \sigma} \qquad \text{Eqn. 5}$$

Where:
W is the width of the band (the number of pixels being averaged), and
$\tau_d$ is a threshold for difference-based filtering (a tuned parameter).

The resulting pixel values from difference-based filtering may be additionally filtered with an offset-based filter. Offsets are computed according to the following equation:

$$O(\tilde{J}) = |O_F(\tilde{J}) - O_B(\tilde{J})| \qquad \text{Eqn. 6:}$$

Where:
$O_F$ and $O_B$ are the Front and Back offset, respectively, and
$\tilde{J}$ refers to the subset of j that is below a threshold condition (i.e., $D(\tilde{J}) < \tau$).

Offset values may be filtered out where they do not meet the following inequality:

$$\tilde{J}|O(\tilde{J}) - \Sigma| < \tau_O \sigma \qquad \text{Eqn. 7:}$$

Where:
$\tau_O$ is a threshold for offset-based filtering (a tuned parameter).

Other filtering techniques may be employed with similar success as understood by those of ordinary skill in tandem with or in place of the filtering techniques discussed. The calculated and filtered offset may then be applied to the unknown pixels selected from the opposite lens/image.

In one such implementation, coloration offsets are calculated by averaging the coloration among all pixels of the same column; for example, for a given column position, both front and back average luminance and chrominance is calculated for all three channels (Y, U, V) of the pixels of the column. Thereafter, the known pixel from the other image is modified by the corrected coloration offset corresponding to the column. As but one illustrative example, consider an unknown pixel of the front image. The unknown pixel is replaced with a known pixel from the back image at the corresponding position (row, column). The replacement pixel is further adjusted by an offset correction value that is calculated by adding the average luminance value for the column of the front image and subtracting the average luminance value corresponding to the column of the back image.

In some variants, an additional smoothing may be performed to further visually smooth the exposure transition prior to multiband blending. In other words, the coloration offsets may be further smoothed (as a function of column) across the exposure transition. Notably, the smoothing function should transition from 0 (informed guess) to 1 (perfectly known) or vice versa so as to ensure visual continuity with the areas outside of the blend; however, some discontinuities within the blending region may be necessary to compensate for the non-linear nature of exposure differences. As previously noted, exposure differences result in non-linear color, white balance, contrast, etc.; thus, using a simple linear blend may result in an under/over correction (e.g., contrast inversion).

Referring now to FIG. 5C, once the three sections of the front and back image have been constructed (and smoothed if desired), then the multiband blend can proceed using the completely overlapping images. Unlike prior multiband blending that ignored unknown pixels for the 6th-9th iterations (scales 5-8), various embodiments of the present disclosure can use the aforementioned informed guess pixels to perform the lowest scales. As a further optimization, the low frequency nature of exposure transitions can be more aggressively blended. For instance, 9 pixels may be blended at scale 6 (5 known pixels, 4 informed guess pixels); 5 pixels may be blended at scale 7 (3 known pixels; 2 informed guess pixels); and 3 pixels may be blended at scale 8 (2 known, 1 informed guess).

Notably, the foregoing discussion is presented in the context of a 513-pixel width band (corresponding to 9 iterations of multiband blend) with an overlap region of 32-pixels; thus, the overlap region is an even number of pixels, however the multiband blend is performed over an odd number of pixels. In other words, the foregoing approach has differently sized (asymmetric) known regions between the front and back images (one image contributes more information than the other). Artisans of ordinary skill in the related arts will readily appreciate that other pixel widths may be substituted by artisans of ordinary skill in the related arts, given the contents of the present disclosure. For example, other implementations may use a symmetric distribution of known regions between the front and back regions.

Additionally, as previously alluded to, the difference image at each scale of the multiband blend contains corresponding frequency information. For example, low frequency information is contained within low scales (e.g., for 9 iterations, the lowest scale is 8) whereas high frequency information is within the high scales (e.g., for 9 iterations, the highest scale is 0). As shown in FIG. 5C, different scales of the pyramid can be blended differently so as to e.g., affect different frequency content differently. Since exposure differences due to lighting conditions primarily affect low frequency image data, various embodiments of the present disclosure disproportionately blend the difference set of images at low scales of the pyramid. In one exemplary embodiment, low frequency scales (e.g., scales 6-8) for a 513-pixel width blend are completely blended (9, 5, and 3 pixel values, respectively), whereas the high frequency scales (e.g., scales 0-5) are lightly blended (only the central 3 pixel values).

Additionally, 360° action photography may vary widely depending on usage; some content may have large differences in exposure between the front and back lenses whereas other content may have little to no difference. Thus, the degree of blending (e.g., aggressive, conservative) may be based on the content and/or capture metadata itself. In some cases, blending may be aggressively performed so as to compensate for large exposure differences; in other cases, blending may be minimally performed so as to minimize the potential for unintentionally introduced artifacts (e.g., visual artifacts introduced by overzealous correction).

The foregoing technique for pre-processing pixels in overlapping images prior to multiband blending is purely illustrative. Artisans of ordinary skill in the related arts will readily appreciate that other variations may be substituted with equal success, given the contents of the present disclosure.

Exemplary Methods

Figure 7:
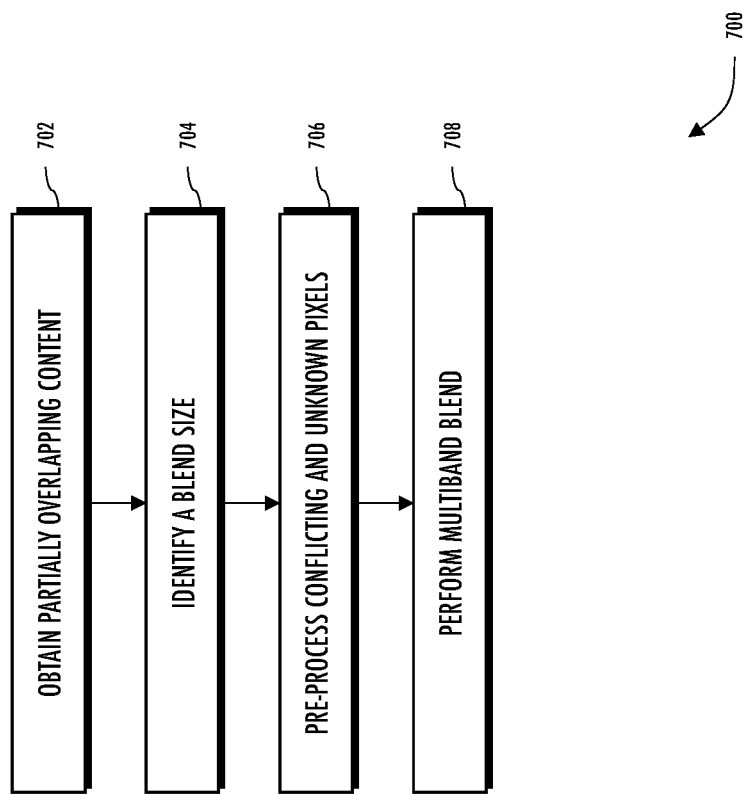
FIG. 7 is a logical block diagram of one exemplary method for blending conflicting and/or unknown pixels in overlapping images, in accordance with the various principles described herein.

FIG. 7 is a logical block diagram of one exemplary method 700 for blending conflicting and/or unknown pixels in overlapping images, consistent with various principles of the present disclosure.

In one exemplary embodiment, method 700 for blending conflicting and/or unknown pixels in overlapping images may be performed by the image signal processor 220 of camera system 200, CPU 230 of laptop 250, and/or GPU 240 of laptop 250. In some embodiments, method 700 may be performed by one or a combination of devices.

At step 702 of the method 700, partially overlapping content is obtained. In one embodiment, partially overlapping content is obtained via a network from a camera or storage device. In another exemplary embodiment, the partially overlapping content are still or motion images (video) that include wide field-of-view (FOV) data captured from two (2) hyper-hemispherical cameras in a Janus orientation. The images of partially overlapping content may be sent from the cameras and received by an image signal processor, CPU, or GPU to manipulate. Other implementations may use any number or combination of e.g., cameras (e.g., 0, 1, 3, 4, etc.) sensors (sonar, lidar, radar, infrared), and/or other source data (e.g., computer models).

In some cases, the partially overlapping content may be obtained by a single omnidirectional camera device (e.g., an action camera). In one embodiment, partially overlapping content may be obtained by one or more cameras of a camera system and one or more cameras external to the camera system (e.g., multiple networked camera devices). In yet another embodiment, the spherical content is obtained from cameras completely external to a device (e.g., a smart phone, laptop, or similar media processing device) and the device partially processes the partially overlapping content.

Partially overlapping content may include two or more images (or motion pictures) that may be stitched and/or blended together. Each image may have an area of the image that overlaps with another image and an area that does not overlap with another image. The overlapping content, from the perspective of a single image has known pixels (the pixels in the image) and unknown pixels (the pixels in the overlapping content and not in the image).

At step 704 of the method 700, a blend size and/or geometry for the partially overlapping content is identified. In one embodiment, the identification is performed by a capture and/or media source device (e.g., image signal processor 220 of camera system 200). In other embodiments, the identification is performed by the rendering and/or media sink device (e.g., CPU 230 of laptop 250, and/or GPU 240 of laptop 250.)

In a first embodiment, the blend size of a multiband blend may be identified by a corresponding range of pixels and their corresponding positions in the overlapping content. A final size of a blended image may then be determined by combining overlapping pixels from all (or both) images. Depending on the projection/formatting of the content, a single overlap region may be represented in multiple overlapping areas in combined content.

In one exemplary embodiment, the blend size is based on a desired image quality. For example, for a 5.6K spherical image, the image quality may correspond to a blend over 513-pixels (corresponding to 9 iterations of a multiband blend). Larger resolutions (e.g., 8K, 12K, 16K, etc.) may require larger blend sizes. Similarly, applications that have reduced image quality requirements (e.g., reduced bandwidth, reduced memory, reduced playback, etc.) may use smaller blend sizes. More generally, blend size may be determined based on a variety of different considerations including e.g., device processing capability, device display capability, media usage, consumer taste, and/or other considerations.

In one embodiment, the blend geometry is identified based on the placement and/or arrangement of the images. For example, a Janus-style action camera may capture two hemispherical images; the blend geometry may be the overlapping concentric rings of the hemispherical images. In some cases, the hemispherical images may be projected into rectangular formats (e.g., EAC, ERP) that have an overlapping rectangle. More broadly, artisans of ordinary skill in the related arts will recognize that the blend region is defined by the overlapping areas of the images, which may be described by any regular, irregular, or other shape.

At step 706 of the method 700, the conflicting and/or unknown pixels are pre-processed to create completely overlapping images. In one embodiment, the pre-processing is performed by a capture and/or media source device (e.g., image signal processor 220 of camera system 200). In other embodiments, the pre-processing is performed by the rendering and/or media sink device (e.g., CPU 230 of laptop 250, and/or GPU 240 of laptop 250.)

In some embodiments, a stitch may be performed prior-to, or as part of, pre-processing to align the partially overlapping content. Image stitching associates pixels from one image to another image; in some cases, the image stitching may association one-to-one, one-to-many, many-to-one, or even many-to-many pixels. A variety of different image stitching techniques may be used. In some implementations, stitching may merely cut-and-feather together images; in more complex implementations, stitching may entail edge detection, motion estimation/prediction, pixel interpolation, etc.

While the foregoing discussion is presented in the context of stitching from partially overlapping content, artisans of ordinary skill in the related arts given the contents of the present disclosure will readily appreciate that any technique for identifying an arrangement and/or correspondence between the partially overlapping content may be substituted with equal success. Other techniques may use temporal and/or spatial metadata to arrange the partially overlapping content with respect to one another. For example, location-aware cameras may provide capture metadata (time, location, orientation, field-of-view, etc.) that allows subsequent post-processing applications to map pixels between images. In another such example, vision processing and/or computer modeling may be used to map image captures.

In one aspect of the present disclosure, the range of pixels in the multiband blend are populated based on an associated degree of knowability. For instance, in a first embodiment, an alpha mask may be used to determine a degree of contribution to subsequent post-processing. In one such implementations, a weight of 0 is set for unknown pixels that should not contribute any image information, and a weight of 1 is set for known pixels that should be passed without subsequent modification.

In a second embodiment, the fact that unknown pixels are associated with known pixels in other images/from the overlapping content is leveraged. Instead of setting unknown pixel values to a weight of 0, as described in the first embodiment, the overlapping content may be searched at the corresponding position for known pixel values (YCrCb, YUV, RGB, etc.) In some implementations, no additional weighting is performed on the copied pixel values. Any scheme for weighting image information may be used to reflect differences in knowability between pixels. Some variants may scale weights from 0% to 100%. Other variants may use a binary scale, e.g., $2^2$, $2^4$, $2^8$, etc. Still other schemes may use other forms of gradient (polynomial, logarithmic, etc.)

In another aspect, different levels of knowability may result in different pixel treatment. For example, consistent pixel values may be used with modification, whereas conflicting pixel values may require selection/removal.

In one such embodiment, unknown pixels associated with known pixels in the overlapping content are weighted or otherwise adjusted and used in the subsequent blend. Pixel values from the other images of the overlapping content may be searched at the corresponding position, and then adjusted for luminance/exposure differences between images. This may correct issues such as a lens flare in the image by correcting luminance. Consider the example where luminance only changes as a function of vertical pixel columns; in this case, the vertical luminance may be corrected using a simple vertical convolution. In other situations, lighting gradients may be linear, non-linear, uniform, non-uniform, etc. For example, an action camera that is arbitrarily rotated relative to multiple points of colored light may experience complex luminance and/or coloration variances.

For each portion (ring, row, column, etc.) of the overlap section, the average pixel component value from each image may be computed based on "theoretically" identical pixel positions in both images. In some variants, the pixel values from imperfectly stitched overlapping sections may be adjusted (the pixel values may not be perfectly aligned). As but one example, the difference in average luminance and/or coloration may be applied on each portion and may be calculated on a channel-by-channel basis. For instance, transitions in luminance/coloration from one image to another image may be approximated based on the pixel values of the other image. One technique may calculate the average/mean or median luminance in each portion (e.g., ring, row, column, etc.) for each image of the overlapping section, add the luminance value from the other image, and subtract the average/mean or median luminance value from the corresponding portion of the other image.

In some such situations, the average, mean, or median may be taken across a window to provide further smoothing. As but one example, average, mean, and/or median luminance/coloration values may be taken across a number of portions (e.g., two, five, ten, etc. columns). The windowed average, mean, or median may be added to the luminance value from the other image, and the corresponding windowed average/mean or median luminance values from the other image may be subtracted. Still other variants may compare any variation of portion, window of portions, and/or intermix thereof.

In another embodiment, there may be over or under estimation of the flare or offset between lenses (or images) because of imperfect stitching. In such cases, the overlapping content may additionally be screened for outlying portions based on pixel values. Outlying portions may be selected and/or removed prior to the subsequent blend based. As but one such example, imperfect stitching may be estimated, and the anomalous portions may be removed or replaced with an average luminance/coloration values (either an average of the known portions or a local average of the portion's luminance/coloration).

One such technique normalizes differences in luminance/coloration for portions of the overlapping content by identifying portions that exceed an average (or mean, median) luminance/coloration by a threshold value. In one such example, the $L^1$ norm may be computed over a portion in order to determine the average luminance/coloration. As used herein, the mathematical operation "$L^1$ norm" refers to the sum of the magnitudes (absolute value) of the components which are weighted equally. More broadly, any technique to calculate a threshold for identifying outlying pixel values may be substituted with equal success.

Portions that do not exceed the threshold ($L^1$ norm) may be used for subsequent blending. In other words, the estimated offset values for selected columns are retained for subsequent calculation. Portions that exceed the threshold may be selected for inclusion, or alternatively removed, for subsequent blending. Removed portions may be replaced with interpolated values. The interpolation may be based on offset values in adjacent columns.

In some variants, offset values may additionally be smoothed to transition as a function of distance from the boundary between images (e.g., lower weighting near the boundary, higher weighting away from the boundary). In some cases, blending may follow a smooth transition. For example, a polynomial weighing function that goes from 0 to 1 can be used to create a smooth transition for offsets. More generally, any function that weights known values against unknown values may be substituted with equal success. Such weighting may be linear, non-linear, continuous, discontinuous, polynomial, trigonometric, logarithmic, piecewise, or combination thereof.

More broadly, various techniques may be used to select, remove, and/or augment image data for blending. While the present discussion uses known pixels from another camera (spatial), artisans of ordinary skill in the related arts given the contents of the present disclosure will appreciate that other sources of pixel information may be used including temporal and/or interpolated or extrapolated values may be used. For example, different overlapping images that make up the final blend may be used to fill in the "unknown" pixels by using the position of every pixel in a common set of reference coordinates. In another embodiment, "unknown" pixels may be filled in from corresponding pixels in other frames of video content. In some examples, the frame of video content may be from a previously blended composite frame (e.g., the frame prior).

In one exemplary embodiment, completely overlapping content is created based on the conflicting and/or unknown pixels from the partially overlapping content. In some implementations, the completely overlapping content may merely copy pixel values from each of the constituent partially overlapping content; alternatively, the completely overlapping content may include derived or otherwise pre-processed values based on the source pixel values.

Within the context of the present disclosure, the terms "partial" and "partially" refers to overlapping content that does not match the desired output blend size and/or geometry. For example, images that partially overlap have: (i) one or more pixels that correspond to the output blend, and (ii) one or more pixels that are unknown and are masked/zero'd out. This is undesirable since an abrupt transition from non-zero data (known image data) to zero'd data (unknown image data) may introduce high frequency artifacts into the multiband blend. In contrast, the terms "complete" and "completely" refer to overlapping content that matches the desired output blend size and/or geometry. A multiband blend that is performed on completely overlapping content smoothly transitions from known pixel data to lesser-known pixel data (taken from a different image). The smoother transition reduces high frequency artifacts in the multiband blend, providing better blend quality.

In some exemplary embodiments, the type and/or complexity of pre-processing may be based on characteristics of the system performing the pre-processing. For example, some variants may adjust pre-processing based on device considerations (e.g., bandwidth, memory, etc.). Systems with limited resources (e.g., on-camera or a CPU/GPU that is currently idle) may only perform basic pre-processing (the known and unknown pixels may be copied and directly used for blending). In contrast, pre-processing on a dedicated workstation or a device with dedicated GPU memory may be more comprehensive (e.g., known and unknown pixels may be adjusted for luminance/coloration and selectively used/removed). In other examples, variants may adjust pre-processing complexity depending on end usage considerations (e.g., image quality, real-time/near real-time usage, etc.) For example, pre-processing complexity may be reduced for real-time or near real-time applications.

While the present discussion is described in the context of a two-camera system; higher-order camera systems may use multiple cameras to reconcile pixel knowability. For instance, a three-camera system may average three or more-pixel values using a simple majority scheme to arrive at an averaged pixel value. Similarly, since multi-camera lens effects are typically caused by the camera mechanisms and unique to each captured image, alternative implementations may remove outlying pixel values prior to averaging based on e.g., a voting scheme. As but one such example, three overlapping captures of the same subject may detect and ignore lens flare from one image and average the pixel values from the remaining two captures.

At step 708 of the method 700, a multiband blend is performed on the completely overlapping images. In one embodiment, the multiband blend is performed by a capture and/or media source device (e.g., image signal processor 220 of camera system 200). In other embodiments, the multiband blend is performed by the rendering and/or media sink device (e.g., CPU 230 of laptop 250, and/or GPU 240 of laptop 250.)

A Laplacian "pyramid" may be calculated (as shown in FIGS. 1A and 1B) to perform a blend large enough to smooth and hide low frequency color differences across a stitch line while preserving high frequency details by blending low frequencies on large areas and high frequency on small areas. As previously noted, smoother transitions reduce artificial high frequency artifacts in the multiband blend, thus providing better blend quality.

In one embodiment, computing the pyramid is an iterative process of downscaling the completely overlapping images, upscaling the downscaled completely overlapping images, and computing the difference. By working on a specific level of the pyramid's difference image, the present techniques are able to blend/smooth a specific range of frequencies of the image. One downscale/upscale/difference calculation is a scale of the pyramid. A number of scales of the pyramid may be selected based on the size of the overlap band, the desired smoothness of the blend, and/or computation availability.

At each scale selected, the differences are blended and the pyramid is reconstructed by recursively upscaling the lower scale and adding the current blended difference image. In one exemplary embodiment, low frequency scales (e.g., scales 6-8) for a 513-pixel width blend are completely blended (9, 5, and 3 pixel values, respectively), whereas the high frequency scales (e.g., scales 0-5) are lightly blended (only the central 3 pixel values).

The blended image is incorporated back into the projection which may include performing a stretching operation to fit the sizes of the projection or reprojecting the image into a different format. For example, the exemplary EAC projection with retained overlapping image data format has four faces of 21.5×64 pixels to be blended and two faces 21×64 that may be left untouched. When blended areas are added back, those faces may be only 20.5×64 pixels wide because of the removal of a 32 pixel overlap area and may be stretched to fit the 21×64 pixel face.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated mchannelay be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for image processing, comprising:
   a processor; and
   a non-transitory computer-readable medium comprising one or more instructions which, when executed by the processor causes the apparatus to:
      receive a first image and a second image extracted from a projection of spherical content, where the first image and the second image are partially overlapping images comprising an overlapping region characterized by an overlap band with a 64-pixel width;
      generate a first completely overlapping 513-pixel-width image comprising a first 225-pixel width portion comprising first pixel values in the first image and a first 224-pixel width portion comprising first estimated pixel values, the first estimated pixel values based on second pixel values in the second image;
      generate a second completely overlapping 513-pixel-width image, different from the first completely overlapping 513-pixel-width image, the second completely overlapping 513-pixel-width image comprising a second 225-pixel width portion comprising the second pixel values in the second image and a second 224-pixel width portion comprising second estimated pixel values, the second estimated pixel values based on the first pixel values of the first image;
      blend the first completely overlapping 513-pixel-width image and the second completely overlapping 513-pixel-width image to generate a blended image; and
      incorporate at least a portion of the blended image into the projection of spherical content.

2. The apparatus for image processing of claim 1, further comprising a first camera and a second camera, wherein the first image is received from the first camera and the second camera is received from the second camera.

3. The apparatus for image processing of claim 1, where generating the second completely overlapping 513-pixel-width image comprises calculating an offset to compensate for exposure differences between the first image and the second image.

4. The apparatus for image processing of claim 3, wherein calculating the offset comprises:
   determining corresponding columns of pixels between the first image and the second image, and
   calculating a plurality of column offsets based on exposure differences between the corresponding columns of pixels.

5. The apparatus for image processing of claim 4, wherein calculating the offset further comprising removing outlier offset values from the plurality of column offsets.

6. The apparatus for image processing of claim 1, where generating the second completely overlapping 513-pixel-width image comprises calculating an offset to compensate for a lens flare present in the second image.

7. The apparatus for image processing of claim 1, wherein the one or more instructions, when executed by the processor, further causes the apparatus to sort pixels in the overlapping region of the first image and the second image based on coloration offsets to neighboring pixels.

8. A method for blending unknown pixels in overlapping images, comprising:
   obtaining first content comprising first separate content and first overlapping content;
   obtaining second content comprising second separate content and second overlapping content, the first overlapping content and the second overlapping content associated with an overlapping field of view;
   identifying a lens flare in the first overlapping content;
   identifying a conflicting absence of the lens flare in the second overlapping content;
   estimating an estimated second separate content based on compensating the second separate content based on first pixel positions in the first content and the conflicting absence of the lens flare;
   generating a first completely overlapping image with first dimensions by copying the first separate content, the first overlapping content, and the estimated second separate content;
   estimating an estimated first separate content based on compensating the first separate content based on second pixel positions in the second content and the lens flare;
   generating a second completely overlapping image with the first dimensions by copying the estimated first separate content, the second overlapping content, and the second separate content; and
   performing a multiband blend on the first completely overlapping image and the second completely overlapping image generating a blended image with the first dimensions.

9. The method for blending unknown pixels in overlapping images of claim 8, where obtaining the first content and the second content comprises receiving two images each captured by a different camera, the first overlapping content and the second overlapping content each comprising an overlap band of overlapping image data shared between the two images.

10. The method for blending unknown pixels in overlapping images of claim 8, where estimating the estimated second separate content comprises identifying a corresponding pixel in a corresponding position in the first content to the second content.

11. The method for blending unknown pixels in overlapping images of claim 8, where:
   estimating the estimated second separate content is further based on compensating the second separate content based on first luminance values in the first content, and
   estimating the estimated first separate content is further based on compensating the first separate content based on second luminance values in the second content.

12. The method for blending unknown pixels in overlapping images of claim 8, further comprises:
   determining a luminance offset by taking a difference of luminance values between first pixels of the first overlapping content and second pixels of the second overlapping content,
   where:
      estimating the estimated second separate content is further based on the luminance offset, and estimating the estimated first separate content is further based on the luminance offset.

13. The method for blending unknown pixels in overlapping images of claim 8, further comprises:
    determining a first luminance offset for a first column of pixels in the second overlapping content based on a difference between a first mean or median luminance of the first column of pixels in the second separate content and a second mean or median luminance of a corresponding column of pixels in the first overlapping content; and
    applying the first luminance offset to the first column of pixels in the second overlapping content.

14. The method for blending unknown pixels in overlapping images of claim 13, generating the first completely overlapping image comprises:
    filtering out the first luminance offset associated with the first column of pixels as an outlier compared to other columns of pixels; and
    interpolating other luminance offset values associated with adjacent columns of pixels to determine a new offset value associated with the first column of pixels.

15. The method for blending unknown pixels in overlapping images of claim 13, where determining the first luminance offset for the first column of pixels further comprises:
    smoothing the difference associated with the first column of pixels and other difference values associated with other columns of pixels in the second overlapping content with a weighting function.

16. The method for blending unknown pixels in overlapping images of claim 8, further comprising stitching the first content and the second content.

17. The method for blending unknown pixels in overlapping images of claim 8, where performing the multiband blend on the first completely overlapping image and the second completely overlapping image comprises:
    computing a Laplacian pyramid on the first completely overlapping image and the second completely overlapping image generating a plurality of difference images at a plurality of scales, a plurality of downsampled images at the plurality of scales, and a plurality of upsampled images at the plurality of scales;
    blending the plurality of difference images at each of the plurality of scales; and
    reconstructing the blended image based on blending the plurality of difference images.

18. A non-transitory computer-readable apparatus comprising a storage medium having a computer program stored thereon, the computer program comprising a plurality of instructions configured to, when executed by a processor apparatus, cause an apparatus to:
    receive a first image and a second image, the first image and the second image aligned at a stitch line within an overlap region common to the first image and the second image;
    determine an image quality;
    determine a number of scales of a multiband blend based on the image quality;
    determine a pixel-width of a final blending band based on the number of scales of the multiband blend, the pixel-width being larger than a width of the overlap region;
    extract first overlap pixels within the overlap region from the first image;
    extract first separate pixels outside the overlap region from the first image based on the pixel-width;
    extract second overlap pixels within the overlap region from the second image;
    extract second separate pixels outside the overlap region from the second image based on the pixel-width;
    perform first corrections on the first separate pixels to generate first corrected pixels;
    perform second corrections on the second separate pixels to generate second corrected pixels;
    generate a first blending band of the pixel-width based on combining the first separate pixels, the first overlap pixels, and the second corrected pixels;
    generate a second blending band of the pixel-width based on combining the first corrected pixels, the second overlap pixels, and the second separate pixels; and
    perform the multiband blend of the first blending band and the second blending band over the number of scales generating the final blending band.

19. The non-transitory computer-readable apparatus of claim 18, where the plurality of instructions are further configured to, when executed by the processor apparatus, cause the apparatus to:
    calculate a first set of mean color pixel values corresponding to first columns of the first overlap pixels;
    calculate a second set of mean color pixel values corresponding to second columns of the second overlap pixels;
    calculate a first set of offsets by subtracting the second set of mean color pixel values from the first set of mean color pixel values;
    calculate a second set of offsets by subtracting the first set of mean color pixel values from the second set of mean color pixel values;
    apply the first set of offsets to first corresponding pixels of the second separate pixels; and
    apply the second set of offsets to the first separate pixels.

20. The non-transitory computer-readable apparatus of claim 18, where the plurality of instructions are further configured to, when executed by the processor apparatus, cause the apparatus to:
    compute a Laplacian pyramid on the first blending band and the second blending band generating a plurality of difference images corresponding to the number of scales and a plurality of downsampled images corresponding to the number of scales and a plurality of upsampled images corresponding to the number of scales, generating at least a portion of the plurality of downsampled images using pixels from the first corrected pixels and the second corrected pixels;
    blend the plurality of difference images at each of the number of scales; and
    reconstruct the final blending band based on blending the plurality of difference images.

* * * * *

UNITED STATES PATENT AND TRADEMARK OFFICE
CERTIFICATE OF CORRECTION

PATENT NO. : 12,051,173 B2
APPLICATION NO. : 17/230177
DATED : July 30, 2024
INVENTOR(S) : Marc Lebrun Page 1 of 1

It is certified that error appears in the above-identified patent and that said Letters Patent is hereby corrected as shown below:

In the Specification

Column 4, Line 57, the text "¼" should read --½--.

Signed and Sealed this
Twenty-eighth Day of January, 2025

Coke Morgan Stewart
*Acting Director of the United States Patent and Trademark Office*